(12) United States Patent
Bradwell et al.

(10) Patent No.: US 10,608,212 B2
(45) Date of Patent: Mar. 31, 2020

(54) ELECTROCHEMICAL ENERGY STORAGE DEVICES AND HOUSINGS

(71) Applicant: Ambri Inc., Cambridge, MA (US)

(72) Inventors: David J. Bradwell, Arlington, MA (US); Alex T. Vai, Sudbury, MA (US); Jianyi Cui, Andover, MA (US); Brian Neltner, Somerville, MA (US)

(73) Assignee: AMBRI INC., Marlborough, MA (US)

( * ) Notice: Subject to any disclaimer, the term of this patent is extended or adjusted under 35 U.S.C. 154(b) by 807 days.

(21) Appl. No.: 14/687,838

(22) Filed: Apr. 15, 2015

(65) Prior Publication Data

US 2015/0325821 A1    Nov. 12, 2015

Related U.S. Application Data

(63) Continuation of application No. PCT/US2013/065086, filed on Oct. 15, 2013.
(Continued)

(51) Int. Cl.
*H01M 2/06* (2006.01)
*H01M 2/08* (2006.01)
(Continued)

(52) U.S. Cl.
CPC .............. *H01M 2/06* (2013.01); *H01M 2/024* (2013.01); *H01M 2/0245* (2013.01);
(Continued)

(58) Field of Classification Search
CPC ...... H01M 2/06; H01M 2/065; H01M 2/0486; H01M 2/0482; H01M 2/30; H01M 2/206;
(Continued)

(56) References Cited

U.S. PATENT DOCUMENTS

| 2,587,443 A | 2/1952 | Crabtree |
| 3,057,946 A | 10/1962 | Eidensohn |

(Continued)

FOREIGN PATENT DOCUMENTS

| AU | 2014229643 A1 | 9/2015 |
| AU | 2016225020 A1 | 9/2017 |

(Continued)

OTHER PUBLICATIONS

U.S. Appl. No. 14/178,806, filed Feb. 12, 2014, Bradwell et al.
(Continued)

*Primary Examiner* — Yoshitoshi Takeuchi
(74) *Attorney, Agent, or Firm* — Wilson Sonsini Goodrich & Rosati

(57) ABSTRACT

The disclosure provides electrochemical batteries, electrochemical battery housings and methods for assembling electrochemical batteries. The battery housing can include a container, a container lid assembly and an electrical conductor. The container can include a cavity that extends into the container from a cavity aperture. The lid assembly can seal the cavity, and can include an electrically conductive container lid and an electrically conductive flange. The container lid can cover the cavity aperture and can include a conductor aperture that extends through the container lid. The flange can cover the conductor aperture and can be electrically isolated from the container lid. The conductor can be connected to the flange and can extend through the conductor aperture into the cavity. The conductor can be electrically isolated from the container lid.

18 Claims, 23 Drawing Sheets

Related U.S. Application Data

(60) Provisional application No. 61/714,714, filed on Oct. 16, 2012, provisional application No. 61/737,068, filed on Dec. 13, 2012.

(51) Int. Cl.
*H01M 2/04* (2006.01)
*H01M 2/02* (2006.01)
*H01M 2/10* (2006.01)
*H01M 2/20* (2006.01)
*H01M 2/30* (2006.01)
*H01M 10/39* (2006.01)

(52) U.S. Cl.
CPC ......... *H01M 2/043* (2013.01); *H01M 2/0434* (2013.01); *H01M 2/0482* (2013.01); *H01M 2/0486* (2013.01); *H01M 2/065* (2013.01); *H01M 2/08* (2013.01); *H01M 2/1077* (2013.01); *H01M 2/206* (2013.01); *H01M 2/30* (2013.01); *H01M 10/399* (2013.01); H01M 2220/10 (2013.01); Y10T 156/10 (2015.01)

(58) Field of Classification Search
CPC .... H01M 2/024; H01M 2/043; H01M 2/0434; H01M 2/08; H01M 2/1077; H01M 2/0245; H01M 10/399; H01M 2/0243; H01M 2220/10
USPC ........................................................ 429/101
See application file for complete search history.

(56) References Cited

U.S. PATENT DOCUMENTS

| | | | |
|---|---|---|---|
| 3,238,437 A | 3/1966 | Foster et al. | |
| 3,245,836 A | 4/1966 | Agruss | |
| 3,419,432 A | 12/1968 | Hesson | |
| 3,488,221 A | 1/1970 | Shimotake et al. | |
| 3,507,703 A | 4/1970 | Heredy | |
| 3,535,214 A | 10/1970 | Rene | |
| 3,607,405 A | 9/1971 | Christopher | |
| 3,607,407 A | 9/1971 | Adams | |
| 3,635,765 A | 1/1972 | Greenberg | |
| 3,663,295 A | 5/1972 | Baker | |
| 3,716,409 A | 2/1973 | Cairns et al. | |
| 3,770,506 A | 11/1973 | Rightmire et al. | |
| 3,775,181 A | 11/1973 | Ryerson | |
| 3,833,420 A | 9/1974 | Will | |
| 3,833,421 A | 9/1974 | Rubischko et al. | |
| 3,833,422 A | 9/1974 | Will et al. | |
| 3,870,561 A | 3/1975 | Charbonnier et al. | |
| 3,877,984 A | 4/1975 | Werth | |
| 3,878,296 A | 4/1975 | Vine et al. | |
| 3,884,715 A | 5/1975 | Gay et al. | |
| 3,887,396 A | 6/1975 | Walsh et al. | |
| 3,898,096 A | 8/1975 | Heredy et al. | |
| 3,907,589 A | 9/1975 | Gay et al. | |
| 3,915,742 A | 10/1975 | Battles et al. | |
| 3,926,673 A | 12/1975 | Saridakis | |
| 3,930,888 A | 1/1976 | Bowser et al. | |
| 3,933,521 A | 1/1976 | Vissers et al. | |
| 3,941,612 A | 3/1976 | Steunenberg et al. | |
| 3,947,291 A | 3/1976 | Yao et al. | |
| 3,954,504 A | 5/1976 | Zellhoefer | |
| 3,959,012 A | 5/1976 | Liang et al. | |
| 3,960,594 A | 6/1976 | Fritz et al. | |
| 3,969,139 A | 7/1976 | Lai | |
| 3,980,495 A | 9/1976 | Roche et al. | |
| 3,988,164 A | 10/1976 | Liang et al. | |
| 4,002,807 A | 1/1977 | Ludwig | |
| 4,011,374 A | 3/1977 | Kaun | |
| 4,015,054 A | 3/1977 | Cleaver et al. | |
| 4,018,969 A | 4/1977 | Fischer et al. | |
| 4,029,860 A | 6/1977 | Vissers et al. | |
| 4,032,614 A | 6/1977 | Lewis | |
| 4,044,194 A | 8/1977 | Evans et al. | |
| 4,060,667 A | 11/1977 | Askew et al. | |
| 4,061,841 A * | 12/1977 | Sharma .............. | H01M 2/065 429/112 |
| 4,065,602 A | 12/1977 | Roche et al. | |
| 4,069,372 A | 1/1978 | Voinov | |
| 4,107,401 A | 8/1978 | Goodson et al. | |
| 4,125,683 A | 11/1978 | Beckford et al. | |
| 4,130,500 A | 12/1978 | Melendres et al. | |
| 4,164,608 A | 8/1979 | Coetzer | |
| 4,169,120 A | 9/1979 | Miller | |
| 4,189,529 A | 2/1980 | Birt et al. | |
| 4,195,123 A | 3/1980 | Jumel | |
| RE30,353 E | 7/1980 | Voinov | |
| 4,216,273 A | 8/1980 | Cadart et al. | |
| 4,238,553 A | 12/1980 | Weddigen et al. | |
| 4,265,984 A | 5/1981 | Kaye | |
| 4,287,268 A | 9/1981 | Coetzer | |
| 4,287,269 A | 9/1981 | Coetzer et al. | |
| 4,299,890 A | 11/1981 | Rea et al. | |
| 4,338,380 A | 7/1982 | Erickson et al. | |
| 4,367,159 A | 1/1983 | Mrazek et al. | |
| 4,405,433 A | 9/1983 | Payne | |
| 4,407,912 A | 10/1983 | Virkar et al. | |
| 4,457,989 A | 7/1984 | Coetzer | |
| 4,510,210 A | 4/1985 | Hunt | |
| 4,565,751 A | 1/1986 | Faust et al. | |
| 4,582,553 A | 4/1986 | Buchta | |
| 4,588,663 A | 5/1986 | Mason et al. | |
| 4,596,637 A | 6/1986 | Kozarek et al. | |
| 4,622,111 A | 11/1986 | Brown et al. | |
| 4,657,830 A | 4/1987 | Kagawa | |
| 4,692,390 A | 9/1987 | Roy | |
| 4,764,437 A | 8/1988 | Kaun | |
| 4,800,143 A | 1/1989 | Harbach et al. | |
| 4,818,638 A | 4/1989 | Roy | |
| 4,833,046 A | 5/1989 | Roy | |
| 4,849,682 A | 7/1989 | Bauer et al. | |
| 4,877,695 A | 10/1989 | Cipriano et al. | |
| 4,886,715 A | 12/1989 | McCullough, Jr. et al. | |
| 4,929,521 A | 5/1990 | Cipriano et al. | |
| 4,945,012 A | 7/1990 | Bugga et al. | |
| 4,945,257 A | 7/1990 | Marrocco | |
| H000816 H | 9/1990 | Carder et al. | |
| 4,954,403 A | 9/1990 | Plichta et al. | |
| 4,965,146 A | 10/1990 | McCullough, Jr. et al. | |
| 4,975,344 A | 12/1990 | Wedlake et al. | |
| 4,999,097 A | 3/1991 | Sadoway | |
| 5,011,748 A | 4/1991 | Shacklette et al. | |
| 5,024,737 A | 6/1991 | Claus et al. | |
| 5,039,351 A | 8/1991 | Cooper et al. | |
| 5,139,895 A | 8/1992 | Roy et al. | |
| 5,185,068 A | 2/1993 | Sadoway | |
| 5,254,232 A | 10/1993 | Sadoway | |
| 5,284,562 A | 2/1994 | Beck et al. | |
| 5,286,359 A | 2/1994 | Richards et al. | |
| 5,369,547 A | 11/1994 | Evans | |
| 5,380,406 A | 1/1995 | Horton et al. | |
| 5,392,191 A | 2/1995 | Thomas et al. | |
| 5,407,119 A | 4/1995 | Churchill et al. | |
| 5,429,895 A | 7/1995 | Lian et al. | |
| 5,469,325 A | 11/1995 | Evans | |
| 5,476,733 A | 12/1995 | Coetzer et al. | |
| 5,491,037 A | 2/1996 | Kawakami et al. | |
| 5,532,078 A | 7/1996 | Redey et al. | |
| 5,536,600 A | 7/1996 | Kaun | |
| 5,538,813 A | 7/1996 | Li | |
| 5,549,989 A | 8/1996 | Anani | |
| 5,559,667 A | 9/1996 | Evans | |
| 5,563,765 A | 10/1996 | Lian et al. | |
| 5,578,389 A | 11/1996 | Tsuchimoto et al. | |
| 5,587,872 A | 12/1996 | Lian et al. | |
| 5,597,331 A | 1/1997 | Gable et al. | |
| 5,604,053 A | 2/1997 | Coetzer et al. | |
| 5,658,447 A | 8/1997 | Watson et al. | |
| 5,661,403 A | 8/1997 | Mackenzie | |
| 5,687,056 A | 11/1997 | Harshe et al. | |

(56) References Cited

U.S. PATENT DOCUMENTS

| | | |
|---|---|---|
| 5,688,613 A | 11/1997 | Li et al. |
| 5,688,614 A | 11/1997 | Li et al. |
| 5,693,434 A | 12/1997 | Li et al. |
| 5,714,283 A | 2/1998 | Briscoe et al. |
| 5,735,933 A | 4/1998 | Yokoyama et al. |
| 5,737,181 A | 4/1998 | Evans |
| 5,763,117 A | 6/1998 | Wright et al. |
| 5,807,412 A | 9/1998 | Li et al. |
| 5,856,041 A | 1/1999 | Inoue et al. |
| 5,874,183 A | 2/1999 | Uematsu |
| 5,972,533 A | 10/1999 | Coetzer et al. |
| 5,982,609 A | 11/1999 | Evans |
| 6,007,943 A | 12/1999 | Coetzer |
| PP11,374 P | 5/2000 | Leue |
| 6,083,296 A | 7/2000 | Innes et al. |
| 6,143,054 A | 11/2000 | Dry |
| 6,180,284 B1 | 1/2001 | Shah et al. |
| 6,218,055 B1 | 4/2001 | Shah et al. |
| 6,221,513 B1 | 4/2001 | Lasater |
| 6,267,799 B1 | 7/2001 | Innes et al. |
| 6,270,553 B1 | 8/2001 | Innes |
| 6,289,034 B1 | 9/2001 | Bates |
| 6,322,745 B1 | 11/2001 | Leigh et al. |
| 6,328,783 B1 | 12/2001 | Bates |
| 6,368,486 B1 | 4/2002 | Thompson et al. |
| 6,379,422 B1 | 4/2002 | Dry |
| 6,379,424 B1 | 4/2002 | Dry |
| 6,379,840 B2 | 4/2002 | Kitoh |
| 6,387,153 B1 | 5/2002 | Burke |
| 6,402,808 B1 | 6/2002 | Dry |
| 6,419,812 B1 | 7/2002 | Beck et al. |
| 6,419,813 B1 | 7/2002 | Brown et al. |
| 6,423,114 B1 | 7/2002 | Burke |
| 6,423,115 B1 | 7/2002 | McCarthy et al. |
| 6,428,603 B1 | 8/2002 | Batterham |
| 6,440,195 B1 | 8/2002 | Dry |
| 6,475,264 B1 | 11/2002 | Dry |
| 6,478,848 B1 | 11/2002 | McCarthy et al. |
| 6,498,406 B1 | 12/2002 | Hoeriuchi et al. |
| 6,517,605 B1 | 2/2003 | Bates et al. |
| 6,548,212 B1 | 4/2003 | Heider et al. |
| 6,549,423 B1 | 4/2003 | Brodnick et al. |
| 6,558,525 B1 | 5/2003 | Bradford et al. |
| 6,579,817 B2 | 6/2003 | Harada et al. |
| 6,585,929 B1 | 7/2003 | Bates et al. |
| 6,602,321 B2 | 8/2003 | Dry et al. |
| 6,692,620 B2 | 2/2004 | Duruz et al. |
| 6,692,631 B2 | 2/2004 | Bergsma |
| 6,692,870 B2 | 2/2004 | Miyake et al. |
| 6,706,239 B2 | 3/2004 | Haack et al. |
| 6,719,889 B2 | 4/2004 | Brown |
| 6,723,222 B2 | 4/2004 | Bergsma et al. |
| 6,730,210 B2 | 5/2004 | Thompson et al. |
| 6,733,924 B1 | 5/2004 | Skotheim et al. |
| 6,906,436 B2 | 6/2005 | Jenson et al. |
| 6,924,164 B2 | 8/2005 | Jenson |
| 6,962,613 B2 | 11/2005 | Jenson |
| 6,963,186 B2 | 11/2005 | Hobbs |
| 6,986,965 B2 | 1/2006 | Jenson et al. |
| 7,055,733 B2 | 6/2006 | Weil et al. |
| 7,077,945 B2 | 7/2006 | Bergsma et al. |
| 7,131,189 B2 | 11/2006 | Jenson |
| 7,144,655 B2 | 12/2006 | Jenson et al. |
| 7,157,187 B2 | 1/2007 | Jenson |
| 7,184,903 B1 | 2/2007 | Williams et al. |
| 7,194,801 B2 | 3/2007 | Jenson et al. |
| 7,211,351 B2 | 5/2007 | Klaassen |
| 7,250,233 B2 | 7/2007 | Choi et al. |
| 7,274,118 B2 | 9/2007 | Jenson et al. |
| 7,294,209 B2 | 11/2007 | Shakespeare |
| 7,328,831 B1 | 2/2008 | Topolski |
| 7,344,804 B2 | 3/2008 | Klaassen |
| 7,373,222 B1 | 5/2008 | Wright et al. |
| 7,389,189 B2 | 6/2008 | Williams et al. |
| 7,389,580 B2 | 6/2008 | Jenson et al. |
| 7,433,655 B2 | 10/2008 | Jacobs et al. |
| 7,504,017 B2 | 3/2009 | Cardarelli |
| 7,513,219 B2 | 4/2009 | Louden |
| 7,568,537 B2 | 8/2009 | King |
| 7,603,144 B2 | 10/2009 | Jenson et al. |
| 7,612,537 B2 | 11/2009 | Wynne et al. |
| 7,632,604 B2 | 12/2009 | Iacovangelo et al. |
| 7,678,484 B2 | 3/2010 | Tao et al. |
| 7,776,190 B2 | 8/2010 | Hiltmann et al. |
| 7,776,191 B2 | 8/2010 | Hiltmann et al. |
| 7,776,478 B2 | 8/2010 | Klaassen |
| 7,808,131 B2 | 10/2010 | Hurst et al. |
| 7,877,120 B2 | 1/2011 | Jacobs et al. |
| 7,883,796 B2 | 2/2011 | Kida et al. |
| 7,931,989 B2 | 4/2011 | Klaassen |
| 7,939,205 B2 | 5/2011 | Klaassen |
| 7,943,270 B2 | 5/2011 | Blake et al. |
| 8,034,484 B2 | 10/2011 | Inatomi et al. |
| 8,044,508 B2 | 10/2011 | Jenson et al. |
| 8,080,326 B2 | 12/2011 | Chan et al. |
| 8,101,293 B2 | 1/2012 | Chan et al. |
| 8,110,301 B2 | 2/2012 | Iacovangelo et al. |
| 8,142,569 B2 | 3/2012 | Kalynushkin et al. |
| 8,178,231 B2 | 5/2012 | Soloveichik et al. |
| 8,202,641 B2 | 6/2012 | Winter et al. |
| 8,219,140 B2 | 7/2012 | Jacobs et al. |
| 8,221,912 B2 | 7/2012 | Fujiwara |
| 8,236,440 B2 | 8/2012 | Bendert |
| 8,237,407 B2 | 8/2012 | Hurst et al. |
| 8,268,471 B2 | 9/2012 | Sadoway et al. |
| 8,281,877 B2 | 10/2012 | Shahin et al. |
| 8,298,701 B2 | 10/2012 | Whitacre et al. |
| 8,306,671 B1 | 11/2012 | Marcus |
| 8,311,681 B1 | 11/2012 | Marcus |
| 8,313,719 B2 | 11/2012 | Barker et al. |
| 8,323,816 B2 | 12/2012 | Bradwell et al. |
| 8,329,336 B2 | 12/2012 | Soloveichik et al. |
| 8,334,053 B2 | 12/2012 | Shapiro et al. |
| 8,343,646 B1 | 1/2013 | Wilkins et al. |
| 8,409,744 B2 | 4/2013 | Ijaz et al. |
| 8,436,489 B2 | 5/2013 | Stahlkopf et al. |
| 8,457,800 B2 | 6/2013 | Marcus |
| 8,460,814 B2 | 6/2013 | Deane et al. |
| 8,471,520 B2 | 6/2013 | Coe et al. |
| 8,475,954 B2 | 7/2013 | Ijaz et al. |
| 8,504,214 B2 | 8/2013 | Gene et al. |
| 8,537,581 B2 | 9/2013 | Wagoner et al. |
| 8,539,763 B2 | 9/2013 | McBride et al. |
| 8,568,915 B2 | 10/2013 | Fuhr et al. |
| 8,642,201 B2 | 2/2014 | Cheng et al. |
| 8,643,500 B2 | 2/2014 | Lee et al. |
| 8,652,672 B2 | 2/2014 | Whitacre et al. |
| 8,722,226 B2 | 5/2014 | Chiang et al. |
| 8,764,962 B2 | 7/2014 | Allanore et al. |
| 8,766,642 B2 | 7/2014 | Bogdan et al. |
| 8,806,866 B2 | 8/2014 | McBride et al. |
| 8,815,445 B2 | 8/2014 | Sugiura et al. |
| 9,000,713 B2 | 4/2015 | Boysen et al. |
| 9,076,996 B2 | 7/2015 | Bradwell et al. |
| 9,106,980 B2 | 8/2015 | Parakulam et al. |
| 9,153,803 B2 | 10/2015 | Chung et al. |
| 9,312,522 B2 | 4/2016 | Bradwell et al. |
| 9,502,737 B2 | 11/2016 | Bradwell et al. |
| 9,520,618 B2 | 12/2016 | Bradwell et al. |
| 9,559,386 B2 | 1/2017 | Bradwell et al. |
| 9,787,119 B2 | 10/2017 | Yamauchi et al. |
| 9,825,265 B2 | 11/2017 | Bradwell et al. |
| 9,876,258 B2 | 1/2018 | Bradwell et al. |
| 9,893,385 B1 | 2/2018 | Nayar et al. |
| 9,925,881 B2 | 3/2018 | Manotas, Jr. et al. |
| 2002/0009649 A1 | 1/2002 | Sato et al. |
| 2002/0051912 A1* | 5/2002 | Fitter ............... H01M 10/4235 429/347 |
| 2002/0064704 A1 | 5/2002 | Thackeray et al. |
| 2003/0008212 A1 | 1/2003 | Akashi et al. |
| 2003/0044686 A1 | 3/2003 | Bushong et al. |
| 2003/0186111 A1 | 10/2003 | Tamakoshi |
| 2003/0196908 A1 | 10/2003 | Brown |

(56) References Cited

U.S. PATENT DOCUMENTS

| | | |
|---|---|---|
| 2003/0203279 A1* | 10/2003 | Tsukamoto ............ H01M 2/027 429/176 |
| 2003/0207161 A1 | 11/2003 | Rusta-Sallehy et al. |
| 2003/0228520 A1 | 12/2003 | Kaun |
| 2004/0061841 A1 | 4/2004 | Black et al. |
| 2004/0076885 A1 | 4/2004 | Sato et al. |
| 2004/0229116 A1 | 11/2004 | Malinski et al. |
| 2004/0258953 A1 | 12/2004 | Kido et al. |
| 2005/0079411 A1 | 4/2005 | Kairawicz et al. |
| 2005/0237029 A1 | 10/2005 | Takezawa et al. |
| 2006/0127735 A1* | 6/2006 | Sabin ................. H01M 8/0258 429/434 |
| 2006/0151333 A1 | 7/2006 | Banek |
| 2007/0215483 A1 | 9/2007 | Johansen et al. |
| 2007/0252556 A1 | 11/2007 | West et al. |
| 2008/0023321 A1 | 1/2008 | Sadoway |
| 2008/0044725 A1 | 2/2008 | Sadoway et al. |
| 2008/0050295 A1 | 2/2008 | Uchida et al. |
| 2008/0053838 A1 | 3/2008 | Yamaguchi et al. |
| 2008/0118428 A1 | 5/2008 | Awano et al. |
| 2008/0145755 A1 | 6/2008 | Iacovangelo et al. |
| 2008/0264565 A1 | 10/2008 | Sun et al. |
| 2008/0308415 A1 | 12/2008 | Hiltmann et al. |
| 2009/0011331 A1 | 1/2009 | Stringer et al. |
| 2009/0014320 A1 | 1/2009 | Chiang et al. |
| 2009/0029236 A1 | 1/2009 | Mailley et al. |
| 2009/0162736 A1* | 6/2009 | Vallance ................. H01M 4/38 429/50 |
| 2009/0208836 A1 | 8/2009 | Fuhr et al. |
| 2009/0212743 A1 | 8/2009 | Hagiwara et al. |
| 2009/0253017 A1 | 10/2009 | Larsen et al. |
| 2009/0297892 A1 | 12/2009 | Ijaz et al. |
| 2010/0028723 A1 | 2/2010 | Haba |
| 2010/0047671 A1 | 2/2010 | Chiang et al. |
| 2010/0058578 A1 | 3/2010 | Vallance et al. |
| 2010/0068610 A1 | 3/2010 | Sudworth |
| 2010/0089547 A1 | 4/2010 | King et al. |
| 2010/0119847 A1 | 5/2010 | Wu et al. |
| 2010/0154205 A1 | 6/2010 | Nakagawa et al. |
| 2010/0178532 A1 | 7/2010 | Shapiro et al. |
| 2010/0233518 A1 | 9/2010 | Kwon et al. |
| 2010/0240517 A1 | 9/2010 | Ashkin et al. |
| 2010/0243017 A1 | 9/2010 | Normann et al. |
| 2010/0291443 A1 | 11/2010 | Farmer |
| 2011/0014503 A1 | 1/2011 | Bradwell et al. |
| 2011/0014505 A1* | 1/2011 | Bradwell ............ H01M 2/0252 429/51 |
| 2011/0027624 A1 | 2/2011 | Deane et al. |
| 2011/0027627 A1 | 2/2011 | Deane et al. |
| 2011/0027633 A1 | 2/2011 | Deane et al. |
| 2011/0027637 A1 | 2/2011 | Deane et al. |
| 2011/0027638 A1 | 2/2011 | Deane et al. |
| 2011/0027639 A1 | 2/2011 | Deane et al. |
| 2011/0048066 A1 | 3/2011 | Gielda et al. |
| 2011/0050235 A1 | 3/2011 | Bogdan, Jr. et al. |
| 2011/0052968 A1 | 3/2011 | Venkataramani et al. |
| 2011/0086258 A1 | 4/2011 | Yaginuma et al. |
| 2011/0104570 A1 | 5/2011 | Galloway et al. |
| 2011/0111296 A1 | 5/2011 | Berdichevsky et al. |
| 2011/0135975 A1 | 6/2011 | Fuhr et al. |
| 2011/0177413 A1 | 7/2011 | Tao et al. |
| 2011/0189520 A1 | 8/2011 | Carter et al. |
| 2011/0200848 A1 | 8/2011 | Chiang et al. |
| 2011/0262794 A1 | 10/2011 | Yoon |
| 2012/0003508 A1 | 1/2012 | Narbonne et al. |
| 2012/0003513 A1 | 1/2012 | Fuhr |
| 2012/0015235 A1 | 1/2012 | Fuhr et al. |
| 2012/0077095 A1 | 3/2012 | Roumi et al. |
| 2012/0104990 A1 | 5/2012 | Boysen et al. |
| 2012/0107675 A1 | 5/2012 | Kim |
| 2012/0125784 A1 | 5/2012 | Berlin et al. |
| 2012/0129056 A1 | 5/2012 | Majima et al. |
| 2012/0146585 A1 | 6/2012 | Darcy |
| 2012/0161083 A1 | 6/2012 | Jha et al. |
| 2012/0183838 A1 | 7/2012 | An et al. |
| 2012/0191262 A1 | 7/2012 | Marcus |
| 2012/0194140 A1 | 8/2012 | Rijssenbeek et al. |
| 2012/0196170 A1 | 8/2012 | Ijaz et al. |
| 2012/0217032 A1 | 8/2012 | Beaupre et al. |
| 2012/0244404 A1 | 9/2012 | Obasih et al. |
| 2012/0244418 A1 | 9/2012 | Cheng et al. |
| 2012/0264021 A1 | 10/2012 | Sugiura et al. |
| 2012/0265397 A1 | 10/2012 | Aliberti et al. |
| 2012/0282501 A1 | 11/2012 | Haynes et al. |
| 2012/0282508 A1 | 11/2012 | Bendert |
| 2012/0297772 A1 | 11/2012 | McBride et al. |
| 2012/0319653 A1 | 12/2012 | Kumar et al. |
| 2012/0328910 A1 | 12/2012 | Ia et al. |
| 2013/0009602 A1 | 1/2013 | Hoff et al. |
| 2013/0017417 A1 | 1/2013 | Whitacre et al. |
| 2013/0022845 A1 | 1/2013 | Davis et al. |
| 2013/0022852 A1 | 1/2013 | Chang et al. |
| 2013/0029195 A1 | 1/2013 | Peace |
| 2013/0045408 A1 | 2/2013 | Sadoway et al. |
| 2013/0049466 A1 | 2/2013 | Adams |
| 2013/0049478 A1 | 2/2013 | Wagoner et al. |
| 2013/0055559 A1 | 3/2013 | Slocum et al. |
| 2013/0057220 A1 | 3/2013 | Whitacre |
| 2013/0059176 A1 | 3/2013 | Stefani et al. |
| 2013/0059185 A1 | 3/2013 | Whitacre et al. |
| 2013/0065122 A1 | 3/2013 | Chiang et al. |
| 2013/0069001 A1 | 3/2013 | Luo et al. |
| 2013/0071306 A1 | 3/2013 | Camp et al. |
| 2013/0074485 A1 | 3/2013 | McBride et al. |
| 2013/0074488 A1 | 3/2013 | McBride et al. |
| 2013/0074940 A1 | 3/2013 | McBride et al. |
| 2013/0074941 A1 | 3/2013 | McBride et al. |
| 2013/0074949 A1 | 3/2013 | McBride et al. |
| 2013/0084474 A1 | 4/2013 | Mills |
| 2013/0119937 A1 | 5/2013 | Arseneault et al. |
| 2013/0130085 A1 | 5/2013 | Choi |
| 2013/0136980 A1 | 5/2013 | Bartling |
| 2013/0143139 A1 | 6/2013 | Tao et al. |
| 2013/0145764 A1 | 6/2013 | McBride et al. |
| 2013/0166085 A1 | 6/2013 | Cherian et al. |
| 2013/0183544 A1 | 7/2013 | Yoshioka et al. |
| 2013/0295435 A1 | 11/2013 | Vu |
| 2014/0000251 A1 | 1/2014 | McBride et al. |
| 2014/0038012 A1 | 2/2014 | Alimario et al. |
| 2014/0038038 A1 | 2/2014 | Vallance et al. |
| 2014/0099522 A1 | 4/2014 | Spatocco et al. |
| 2014/0113181 A1 | 4/2014 | Bradwell et al. |
| 2014/0162090 A1 | 6/2014 | Whitacre et al. |
| 2014/0220428 A1 | 8/2014 | Zinck et al. |
| 2014/0248521 A1 | 9/2014 | Chiang et al. |
| 2014/0272481 A1 | 9/2014 | Chung et al. |
| 2014/0272508 A1 | 9/2014 | Musetti |
| 2014/0349159 A1 | 11/2014 | Bartling et al. |
| 2015/0004455 A1 | 1/2015 | Bradwell et al. |
| 2015/0010792 A1 | 1/2015 | Amendola et al. |
| 2015/0015210 A1 | 1/2015 | Bradwell et al. |
| 2015/0037670 A1 | 2/2015 | Tanaka et al. |
| 2015/0132627 A1 | 5/2015 | Bradwell et al. |
| 2015/0132628 A1 | 5/2015 | Bradwell et al. |
| 2015/0214579 A1 | 7/2015 | Boysen et al. |
| 2015/0249273 A1 | 9/2015 | Bradwell et al. |
| 2015/0249274 A1 | 9/2015 | Bradwell et al. |
| 2015/0303525 A1 | 10/2015 | Bradwell et al. |
| 2015/0318586 A1 | 11/2015 | Rahmane et al. |
| 2015/0380713 A1 | 12/2015 | Kimura et al. |
| 2016/0006090 A1 | 1/2016 | Licht |
| 2016/0156068 A1 | 6/2016 | Burke et al. |
| 2016/0172714 A1 | 6/2016 | Ouchi et al. |
| 2016/0211555 A9 | 7/2016 | Bradwell et al. |
| 2016/0254512 A1 | 9/2016 | Yin et al. |
| 2016/0301038 A1 | 10/2016 | Modest et al. |
| 2016/0336623 A1 | 11/2016 | Nayar et al. |
| 2016/0344066 A1 | 11/2016 | Sudworth et al. |
| 2016/0365612 A1 | 12/2016 | Bradwell et al. |
| 2016/0372763 A1 | 12/2016 | Lu et al. |
| 2017/0018811 A1 | 1/2017 | Bradwell et al. |
| 2017/0104244 A1 | 4/2017 | Bull et al. |
| 2017/0149095 A1 | 5/2017 | Amendola et al. |
| 2017/0222273 A1 | 8/2017 | Bradwell et al. |

(56) References Cited

U.S. PATENT DOCUMENTS

| | | |
|---|---|---|
| 2017/0248041 A1 | 8/2017 | Lenk et al. |
| 2017/0263951 A1 | 9/2017 | Kanno et al. |
| 2017/0338451 A9 | 11/2017 | Bradwell et al. |
| 2018/0034110 A1 | 2/2018 | Sudworth et al. |
| 2018/0083274 A1 | 3/2018 | Martin |
| 2018/0090726 A1 | 3/2018 | Thompson et al. |
| 2018/0097259 A1 | 4/2018 | Bradwell et al. |
| 2018/0159179 A1 | 6/2018 | Bradwell |

FOREIGN PATENT DOCUMENTS

| | | |
|---|---|---|
| CA | 2767920 A1 | 1/2011 |
| CA | 2811218 A1 | 3/2012 |
| CA | 2887201 A1 | 4/2014 |
| CH | 703320 B1 | 12/2011 |
| CN | 1429417 A | 7/2003 |
| CN | 101436780 A | 5/2009 |
| CN | 101828285 A | 9/2010 |
| CN | 101942676 A | 1/2011 |
| CN | 201809448 U | 4/2011 |
| CN | 201908137 U | 7/2011 |
| CN | 102181883 A | 9/2011 |
| CN | 102498589 A | 6/2012 |
| CN | 102646808 A | 8/2012 |
| CN | 103001239 A | 3/2013 |
| CN | 105190984 A | 12/2015 |
| CN | 105659415 A | 6/2016 |
| DE | 3239964 A1 | 5/1984 |
| DE | 19618609 A1 | 11/1997 |
| EP | 0078404 A2 | 5/1983 |
| EP | 0078404 A3 | 10/1985 |
| EP | 0327959 A1 | 8/1989 |
| EP | 0343333 A1 | 11/1989 |
| EP | 1096593 A2 | 5/2001 |
| EP | 1469536 A1 | 10/2004 |
| EP | 1548912 A1 | 6/2005 |
| EP | 2408083 A1 | 1/2012 |
| EP | 2416464 A2 | 2/2012 |
| EP | 2499507 A1 | 9/2012 |
| EP | 2709188 A1 | 3/2014 |
| GB | 2062939 A | 5/1981 |
| JP | S4933815 B1 | 9/1974 |
| JP | S 55-053877 A1 | 4/1980 |
| JP | S61114664 A | 6/1986 |
| JP | H06223872 A | 8/1994 |
| JP | H 06310171 A | 11/1994 |
| JP | H1012270 A | 1/1998 |
| JP | H117923 A | 1/1999 |
| JP | 2001/115369 | 4/2001 |
| JP | 2001243994 A | 9/2001 |
| JP | 3355377 B2 | 12/2002 |
| JP | 2007-157373 A | 6/2007 |
| JP | 2010535942 A | 11/2010 |
| JP | 2011508379 A | 3/2011 |
| JP | 2012124009 A | 6/2012 |
| JP | 2012-226866 A | 11/2012 |
| JP | 2012533865 A | 12/2012 |
| JP | 2013537361 A | 9/2013 |
| JP | 2014154337 A | 8/2014 |
| JP | 2016510936 A | 4/2016 |
| JP | 2016535392 A | 11/2016 |
| KR | 10-2012-0059106 A | 6/2012 |
| RU | 2013111960 A | 10/2014 |
| SG | 188400 A1 | 4/2013 |
| WO | WO-9965642 A1 | 12/1999 |
| WO | WO 00/05774 A1 | 2/2000 |
| WO | WO 2008/045996 A2 | 4/2008 |
| WO | WO 2008/105811 A2 | 9/2008 |
| WO | WO-2008105807 A2 | 9/2008 |
| WO | WO 2008/045996 A3 | 10/2008 |
| WO | WO 2008/105811 A3 | 12/2008 |
| WO | WO 2009/046533 A1 | 4/2009 |
| WO | WO 2009/151639 A1 | 12/2009 |
| WO | WO 2010/130583 A2 | 11/2010 |
| WO | WO 2011/011056 A2 | 1/2011 |
| WO | WO 2011/014242 A1 | 2/2011 |
| WO | WO 2011/014243 A1 | 2/2011 |
| WO | WO 2011/022390 A2 | 2/2011 |
| WO | WO 2011/025574 A1 | 3/2011 |
| WO | WO 2011/047067 A2 | 4/2011 |
| WO | WO 2011/022390 A3 | 5/2011 |
| WO | WO 2011/050924 A1 | 5/2011 |
| WO | WO 2011/079548 A1 | 7/2011 |
| WO | WO 2011/082659 A1 | 7/2011 |
| WO | WO 2011/047067 A3 | 8/2011 |
| WO | WO 2011/100686 A1 | 8/2011 |
| WO | WO-2011116236 A2 | 9/2011 |
| WO | WO 2011/148347 A1 | 12/2011 |
| WO | WO 2011/153312 A2 | 12/2011 |
| WO | WO 2012/003649 A1 | 1/2012 |
| WO | WO 2012/009145 A2 | 1/2012 |
| WO | WO 2012/033692 A2 | 3/2012 |
| WO | WO 2012/040176 A1 | 3/2012 |
| WO | WO 2011/153312 A3 | 4/2012 |
| WO | WO 2012/009145 A3 | 4/2012 |
| WO | WO 2012/051790 A1 | 4/2012 |
| WO | WO 2012/033692 A3 | 6/2012 |
| WO | WO 2012/129827 A1 | 10/2012 |
| WO | WO 2012/145314 A2 | 10/2012 |
| WO | WO-2012138576 A1 | 10/2012 |
| WO | WO 2012/158751 A1 | 11/2012 |
| WO | WO 2012/158781 A2 | 11/2012 |
| WO | WO 2013/025608 A1 | 2/2013 |
| WO | WO 2013/032667 A1 | 3/2013 |
| WO | WO 2013/048704 A1 | 4/2013 |
| WO | WO 2013/052494 A1 | 4/2013 |
| WO | WO 2014/055873 A1 | 4/2014 |
| WO | WO 2014/062702 A1 | 4/2014 |
| WO | WO 2014/062706 A1 | 4/2014 |
| WO | WO 2014/140792 A2 | 9/2014 |
| WO | WO 2014/190318 A1 | 11/2014 |
| WO | WO 2015/042295 A1 | 3/2015 |
| WO | WO 2015/058010 A1 | 4/2015 |
| WO | WO 2015/058165 A1 | 4/2015 |
| WO | WO 2015/063588 A2 | 5/2015 |
| WO | WO 2015/066359 A1 | 5/2015 |
| WO | WO-2016138499 A1 | 9/2016 |

OTHER PUBLICATIONS

U.S. Appl. No. 14/286,369, filed May 23, 2014, Bradwell et al.
U.S. Appl. No. 14/536,549, filed Nov. 7, 2014, Bradwell et al.
U.S. Appl. No. 14/536,563, filed Nov. 7, 2014, Bradwell et al.
Biswas, et al. Towards Implementation of Smart Grid: An Updated Review on Electrical Energy Storage Systems. Smart Grid and Renewable Energy. 2013; 4:122-132. Published online Feb. 2013.
Bradwell, et al. Magnesium-antimony liquid metal battery for stationary energy storage. J Am Chem Soc. Feb. 1, 2012;134(4):1895-7. doi: 10.1021/ja209759s. Published on web Jan. 6, 2012.
Bradwell, et al. Recycling ZnTe, CdTe, and Other Compound Semiconductors by Ambipolar Electrolysis. J. Am. Chem. Soc., 2011, 133, 19971-19975. Published Oct. 28, 2011.
Bradwell, et al. Supporting Information: Recycling ZnTe, CdTe, and other compound semiconductors by ambipolar electrolysis. J. Am. Chem. Soc., 2011, 133, S1-S8. Published Oct. 28, 2011.
Bradwell, et al. Supporting Material: Magnesium-antimony liquid metal battery for stationary energy storage. J Am Chem Soc. Feb. 1, 2012;134(4):S1-S11. doi: 10.1021/ja209759s. Published on web Jan. 6, 2012.
Bradwell. Liquid metal batteries: ambipolar electrolysis and alkaline earth electroalloying cells. Thesis. Massachusetts Institute of Technology. Dept. of Materials Science and Engineering. 2011.
Bradwell. Technical and economic feasibility of a high-temperature self-assembling battery. Thesis. Department of Material Science and Engineering. MIT. 2006.
Cairns, et al. Galvanic Cells with Fused-Salt Electrolytes. AEC Research and Development. 220 pages, Nov. 1967.
Cairns, et al. High Temperature Batteries Research in high-temperature electrochemistry reveals compact, powerful energy-storage cells. Science. Jun. 20, 1969; 164(3886):1347-1355.

(56) References Cited

OTHER PUBLICATIONS

Chuang. Floating capacitor active charge balancing for PHEV application. Thesis. Ohio State University. 2010.
Crowley, B. New battery could be solar power's BFF video. http://money.cnn.com/video/technology/2012/08/16/bsg-liquid-metal-battery- energy.cnnmoney. CNN Money, 2012. Accessed Jun. 29, 2015.
Donald Sadoway: The Colbert Report video. http://thecolbertreport.cc.com/videos/8uddyg/donald-sadoway. The Colbert Report, Oct. 22, 2012. Accessed Jun. 29, 2015.
Donald Sadoway: The missing link to renewable energy Youtube Video. https://www.youtube.com/watch?v=Sddb0Khx0yA. TED, Mar. 2012. Accessed Jun. 29, 2015.
Electroville: Grid-Scale Batteries. MIT Electroville: High Amperage Energy Storage Device—Energy for the Neighborhood. http://arpa-e.energy.gov/?q=slick-sheet-project/electroville-grid-scale-batteries. Accessed Jul. 2, 2015.
Electroville: High-Amperage Energy Storage Device—Energy Storage for the Neighborhood Project. U.S. Department of Energy Categorical Exclusion Determination Form. http://arpa-e.energy.gov/sites/default/files/25A1089%20MIT%20-%20Electroville.pdf. Accessed Jul. 2, 2015.
Energy 2064 with Professor Donald R. Sadoway Youtube Video. https://www.youtube.com/watch?v=0iwG32R2R5o. Alger, Oct. 7, 2014. Accessed Jun. 29, 2015.
GE Energy Storage Durathon Battery Durathon E620 Battery Module Technical Specifications. Available at http://www.geenergystorage.com/images/ge/PDF/DurathonGridE620ModuleSpecSheet.pdf. 2012, Accessed on Oct. 18, 2012.
Hall-heroult cell. Wikimedia Commons. Accessed Nov. 10, 2014. http://commons.wikimedia.org/wiki/File:Hall-heroult-kk-2008-12-31.png. Dec. 30, 2008.
Intermetallic—Wikipedia Website. https://en.wikipedia.org/wiki/Intermetallic. Accessed Jul. 2, 2015.
International preliminary report on patentability and written opinion dated Apr. 7, 2015 for PCT Application No. US2013/063472.
International preliminary report on patentability and written opinion dated Apr. 21, 2015 for PCT Application No. US2013/065086.
International preliminary report on patentability and written opinion dated Apr. 21, 2015 for PCT Application No. US2013/065092.
International preliminary report on patentability and written opinion dated Jan. 24, 2012 for PCT Application No. US2010/002035.
International preliminary report on patentability and written opinion dated Mar. 26, 2013 for PCT Application No. US2011/052316.
International preliminary report on patentability and written opinion dated Feb. 17, 2009 for PCT Application No. US2007/018168.
International search report and written opnion dated Jun. 11, 2015 for PCT Application No. IB2014/002608.
Jarret, et al. Advances in the Smelting of aluminum. Metallurgical Treatises, pp. 137-157, 1981.
Kane, et al. Electrochemical Determination of the Theimodynamic Properties of Lithium-Antimony Alloys. Journal of the Electrochemical Society, 162 (3) A421-A425 (2015). Published Dec. 31, 2014.
Kelley, et al. Mixing in a liquid metal electrode. Physics of Fluids 26, 2014, 057102, pp. 1-12. Published online May 20, 2014.
Kim, et al. Calcium-bismuth electrodes for large-scale energy storage (liquid metal batteries). Journal of Power Sources, vol. 241, 2013, pp. 239-248. Available online Apr. 19, 2013.
Kim, et al. Liquid Metal Batteries: Past, Present, and Future. Chemical Reviews, vol. 113, No. 3, Mar. 13, 2013, pp. 2075-2099. Published on web Nov. 27, 2012.
Lalau, et al. Sodium-bismuth-lead low temperature liquid metal battery. Journal for Electrochemistry and Plating Technology, Jun. 2015, pp. 1-7.
Liquid Metal Battery Research Company website. http://www.lmbrc.com/. 2015. Accessed Jul. 7, 2015.
Liquid-metal batteries get boost from molten lead. Nature news website. Sep. 21, 2014. Accessed Dec. 9, 2014. http://www.nature.com/news/liquid-metal-batteries-get-boost-from-molten-lead-1.15967.
Magnuski, H. Innovations in Energy Storage—Professor Sadoway Video. https://vimeo.com/20906061. MIT Club of Northern California, Mar. 8, 2011. Accessed Jun. 29, 2015.
MIT Electroville—Liquid Metal Battery wesite. http://www.ct-si.org/events/EnergyInnovation/showcase/popt.html?id=198. 2011. Accessed Jul. 2, 2015.
Molten metal batteries aimed at the grid. BBC News website. Sep. 21, 2014. Accessed Dec. 9, 2014. http://www.bbc.com/news/science-environment-29284934.
NAS Sodium Sulfur Battery Energy Storage System website, accessed Jul. 13, 2015. https://www.ngk.co.jp/nas/specs/#topto_specs.
Ning, et al. Self-healing Li—Bi liquid metal battery for grid-scale energy storage. Journal of Power Sourches 275 (2015) 370-376. Available online Oct. 29, 2014.
Nuvation BMS a Scalable and highly configurable battery management system for grid energy storage systems, 2014. http://nuvation.wpengine.netdna-cdn.com/img/nuvation-bms-web/downloads/NuvationBMS_Grid-Energy_20140922.pdf. Accessed Feb. 4, 2015.
Nuvation BMS Battery Management Systems. http://www.nuvation.com/battery-management-system. Accessed Feb. 4, 2015.
Nuvation Engineering Electronic Product Design Newsletter dated Jul. 9, 2014. http://us4.campaign-archive1.com/?u=d41c6a8dd772177f8c2976a94&id=d288872315&e=724575b634. Accessed Feb. 4, 2015.
Nuvation Engineering Electronic Product Design Newsletter dated Sep. 9, 2014. http://us4.campaign-archive1.com/?u=d41c6a8dd772177f8c2976a94&id=610713e05f&e=e9700170fc. Accessed Feb. 4, 2015.
Ouchi, et al. Calcium-Antimony Alloys as Electrodes for Liquid Metal Batteries. Journal of the Electrochemical Society. 2014; 161(12):A1898-A1904. Published Sep. 9, 2014.
Pflanz, K. A Liquid Layer Solution for the Grid. http://energy.gov/articles/liquid-layer-solution-grid. Sep. 15, 2011. Accessed Jul. 2, 2015.
Pongsaksawad, et al. Phase-Field Modeling of Transport-Limited Electrolysis in Solid and Liquid States. Journal of the Electrochemical Society, 154 (6) pp. F122-F133, 2007. Available electronically Apr. 18, 2007.
Sadoway, et al. Block and graft copolymer electrolytes for high-performance, solid-state, lithium batteries. Journal of Power Sources, Elsevier SA, CH, vol. 129, No. 1, Apr. 15, 2004, pp. 1-3. Available online Jan. 14, 2004.
Sadoway, et al. Innovation in Energy Storage: What I Learned in 3.091 was All I Needed to Know video. http://video.mit.edu/watch/innovation-in-energy-storage-what-i-learned-in-3091-was-all-i-needed-to-know-9601/. MIT Technology Day 2010, Jun. 5, 2010. (Originally posted at http://mitworld.mit.edu/video/800. Archived at http://archive.is/http://mitworld.mit.edu/video/800.) Accessed Jun. 29, 2015.
Shimotake, et al. Bimetallic Galvanic Cells With Fused-Salt Electrolytes. Advances in Energy Conversion Engineering. pp. 951-962. 1967 Intersociety Energy Conversion Engineering Conference. American Society of Mechanical Engineers, 1967.
Spatocco, et al. Cost-based discovery for engineering solutions. pp. 1-43. Adv. In Electrochemical Science and Technology (vol. XV), Feb. 9, 2015.
Staller, A. The Real Science of an Alkali Metal Explosion. The Electrochemical Society, Jan. 28, 2015. Accessed Apr. 20, 2015. http://www.ecsblog.org/uncategorized/the-real-science-behind-an-alkali-metal-explosion/.
Villar, et al. Assessment of high-temperature self-assembling battery implementation based on the aluminum smelting process. Massachusetts Institute of Technology, Dept. of Materials Science and Engineering, Thesis, 2010. http://hdl.handle.net/1721.1/62677.
Wang, et al. Lithium-antimony-lead liquid metal battery for grid-level energy storage Nature. Oct. 16, 2014;514(7522):348-50. doi: 10.1038/nature13700. Epub Sep. 21, 2014.

(56) References Cited

OTHER PUBLICATIONS

Wesoff, E. Video: MIT's Don Sadoway and Energy Storage on the Colbert Report. http://www.greentechmedia.com/articles/read/Video-MITs-Don-Sadoway-and-Energy-Storage-on-the-Colbert-Report. Oct. 24, 2012. Accessed Jul. 2, 2015.
U.S. Appl. No. 14/688,179, filed Apr. 16, 2015, Bradwell et al.
U.S. Appl. No. 14/688,214, filed Apr. 16, 2015, Bradwell et al.
Advisory Action Before Filing of Appeal Brief dated May 10, 2012 for U.S. Appl. No. 12/839,130.
Advisory Action Before Filing of Appeal Brief dated Jun. 8, 2012 for U.S. Appl. No. 12/839,130.
Agruss. The Thermally Regenarative Liquid-Metal Cell, J. Electrochem. Soc. Nov. 1963; 110(11):1097-1103.
Atthey. A Mathematical Model for Fluid Flow in a Weld Pool at High Currents. J. Fluid Mech. 1980; 98(4):787-801.
Biswas, et al. Towards Implementation of Smart Grid: An Updated Review on Electrical Energy Storage Systems. Smart Grid and Renewable Energy. 2013; 4:122-132.
Bradwell, et al. Magnesium-antimony liquid metal battery for stationary energy storage. J Am Chem Soc. Feb. 1, 2012;134(4):1895-7. doi: 10.1021/ja209759s. Epub Jan. 18, 2012.
Bradwell. Liquid metal batteries: ambipolar electrolysis and alkaline earth electroalloying cells. Massachusetts Institute of Technology. Dept. of Materials Science and Engineering. 2011.
Bradwell. Technical and economic feasibility of a high-temperature self-assembling battery. Department of Material Science and Engineering. MIT. Thesis final copy. Aug. 2006.
Cairns, et al. Galvanic Cells with Fused-Salt Electrolytes. AEC Research and Development. 44 pages, Nov. 1967.
Cairns, et al. High Temperature Batteries Research in high-temperature electrochemistry reveals compact, powerful energy-storage cells. Science. Jun. 1969; 164(3886): 1347-1355.
Chuang. Floating capacitor active charge balancing for PHEV application. Master Thesis. Ohio State University. 2010.
Cubicciotti, et al. Metal-Salt Interactions at High Temperatures: The Solubilities of Some alkaline Earth Metals in their Halides. J. Am. Chem. Soc. 1949; 71(6):21492153.
Dworkin, et al. The Electrical Conductivity of Solutions of Metals in their Molten Halides. VIII. alkaline Earth Metal Systems. J. Phys. Chem. Jul. 1966; 70(7):2384.
European search report and search opinion dated Feb. 12, 2014 for EP Application No. 13196841.4.
Gay, et al. Lithium/Chalcogen Secondary Cells for Components in Electric Vehicular-Propulsion Generating Systems. Argonne National Laboratory, Argonne, Illinois, ANL-7863, 62 pages, Jan. 1972.
GE Energy Storage Durathon Battery Durathon E620 Battery Module Technical Specifications. Avallable at http://www.geenergystorage.com/images/ge/PDF/DurathonGridE620ModuleSpecSheet.pdf. Accessed on Oct. 18, 2012.
GE Energy Storage Durathon DC System Technical Specifications—MWh Series, 2014. Accessed Apr. 7, 2015. https://renewables.gepower.com/content/dam/gepower-enewables/global/en_US/documents/Durathon_DCMWh_Spec_Sheet_GEA-988123002A.pdf.
Hall-heroult cell. Wikimedia Commons. Dec. 31, 2008. Accessed Nov. 10, 2014. http://commons.wikimedia.org/wiki/File:Hall-heroult-kk-2008-12-31.png.
International preliminary report on patentability and written opinion dated Apr. 16, 2015 for PCT Application No. US2013/063472.
International preliminary report on patentability and written opinion dated Jan. 24, 2014 for PCT Application No. US2013/065086.
International preliminary report on patentability and written opinion dated Dec. 26, 2013 for PCT Application No. US2013/065092.
International preliminary report on patentability and written opinion dated Feb. 7, 2011 for PCT Application No. US2010/002035.
International preliminary report on patentability and written opinion dated Dec. 29, 2011 for PCT Application No. US2011/052316.
International preliminary report on patentability and written opinion dated Sep. 18, 2008 for PCT Application No. US2007/018168.

International search report and written opinion dated Jan. 22, 2015 for PCT Application No. US2014/061266.
International search report and written opinion dated Jan. 23, 2015 for PCT Application No. PCT/US2014/056367.
International search report and written opinion dated Jan. 24, 2014 for PCT/US2013/065086.
International search report and written opinion dated Jan. 27, 2014 for PCT Application No. US2013/063472.
International search report and written opinion dated Jan. 29, 2015 for PCT Application No. US2014/060979.
International search report and written opinion dated Feb. 7, 2011 for PCT/US2010/002035.
International search report and written opinion dated Sep. 18, 2008 for PCT/US2007/018168.
International search report and written opinion dated Oct. 20, 2014 for PCT Application No. US2014/039439.
International search report and written opinion dated Dec. 26, 2013 for PCT Application No. US2013/065092.
International search report and written opinion dated Dec. 29, 2011 for PCT/US2011/052316.
International search report and written opnion dated Feb. 13, 2015 for PCT Application No. US2014/063222.
International search report dated Oct. 15, 2014 for PCT Application No. IB2014/000617.
Javadekar, et al. Energy Storage in Electrochemical Cells with Molten Sb Electrodes. Journal of the Electrochemical Society, 159 (4) A386-A389 (2012); Jan. 24, 2012 http://repository.upenn.edu/cgi/viewcontent.cgi?article=1170&context=cbe_papers.
Jungblut, et al. Diffusion of lithium in highly oriented pyrolytic graphite at low concentrations and high temperatures. Phys Rev B Condens Matter. Dec. 1, 1989;40(16):10810-10815.
Kane, et al. Electrochemical Determination of the Thermodynamic Properties of Lithium-Antimony Alloys. Journal of the Electrochemical Society, 162 (3) A421-A425 (2015).
Kelley, et al. Mixing in a liquid metal electrode. Physics of Fluids 26, Jan. 2014, 057102, pp. 1-12.
Kim, et al. Calcium-bismuth electrodes for large-scale energy storage (liquid metal batteries). Journal of Power Sources, vol. 241, Apr. 2013, pp. 239-248.
Kim, et al. Liquid Metal Batteries: Past, Present, and Future. Chemical Reviews, vol. 113, No. 3, Mar. 13, 2013, pp. 2075-2099.
Liquid-metal batteries get boost from molten lead. Nature news website. Accessed Dec. 9, 2014. http://www.nature.com/news/liquid-metal-batteries-get-boost-from-molten-lead-1.15967.
Merriam-Webster's Medical Dictionary Website. http://merriam-webster.com/medical/room%20temperature. Apr. 2009.
Molten metal batteries aimed at the grid. BBC News website. Accessed Dec. 9, 2014. http://www.bbc.com/news/science-environment-29284934.
NAS Sodium Sulfur Battery Energy Storage System website, accessed Apr. 7, 2015. https://www.ngk.co.jp/nas/spees/#topto_specs.
Ning, et al. Self-healing Li—Bi liquid metal battery for grid-scale energy storage. Journal of Power Sourches 275 (2015) 370-376.
Notice of allowance dated Jan. 6, 2015 for U.S. Appl. No. 13/237,215.
Notice of allowance dated Mar. 12, 2015 for U.S. Appl. No. 12/839,130.
Notice of allowance dated Apr. 6, 2015 for U.S. Appl. No. 13/801,333.
Notice of allowance dated Apr. 20, 2012 for U.S. Appl. No. 12/505,937.
Notice of allowance dated Apr. 22, 2014 for U.S. Appl. No. 12/839,130.
Notice of allowance dated Apr. 30, 2015 for U.S. Appl. No. 13/801,333.
Notice of allowance dated Jul. 13, 2012 for U.S. Appl. No. 11/839,413.
Notice of allowance dated Aug. 2, 2012 for U.S. Appl. No. 12/505,937.
Office action dated Jan. 5, 2012 for U.S. Appl. No. 12/839,130.
Office action dated Jan. 10, 2014 for U.S. Appl. No. 12/839,130.
Office action dated Mar. 14, 2014 for U.S. Appl. No. 13/237,215.
Office action dated Mar. 16, 2012 for U.S. Appl. No. 12/839,130.
Office action dated May 13, 2011 for U.S. Appl. No. 11/839,413.
Office action dated Aug. 21, 2014 for U.S. Appl. No. 12/839,130.
Office action dated Sep. 3, 2014 for U.S. Appl. No. 13/801,333.
Office action dated Oct. 4, 2011 for U.S. Appl. No. 11/839,413.

(56) References Cited

OTHER PUBLICATIONS

Office action dated Dec. 5, 2014 for U.S. Appl. No. 12/839,130.
Office action dated Dec. 11, 2012 for U.S. Appl. No. 13/588,741.
Ouchi, et al. Calcium-Antimony Alloys as Electrodes for Liquid Metal Batteries. Journal of the Electrochemical Society. 2014; 161(12):A1898-A1904.
Pongsaksawad, et al. Phase-Field Modeling of Transport-Limited Electrolysis in Solid and Liquid States. Journal of the Electrochemical Society, 154 (6) pp. F122-F133, 2007.
Powell, et al. Modeling electrochemistry in metallurgical processes. Chemistry and Materials Science; JOM Journal of the Minerals, Metals and Materials Society vol. 59, No. 5 (2007), 35-43, DOI: 10.1007/s11837-007-0063-y http://lyre.mit.edu/~powell/papers/jom-0705-35-43.pdf.
Response After Final Rejection dated Apr. 27, 2012 for U.S. Appl. No. 12/839,130.
Sadoway, et al. Block and graft copolymer electrolytes for high-performance, solid-state, lithium batteries. Journal of Power Sources, Elsevier SA, CH, vol. 129, No. 1, Apr. 15, 2004, pp. 1-3.
Shimotake, et al. Bimetallic Galvanic Cells With Fused-Salt Electrolytes. Argonne National Laboratory, Argonne, Illinois, pp. 951-962.
Shimotake, et al. Secondary Cells with Lithium Anodes and Immobilized Fused-Salt Electrolytes. I & EC ProcessDesign and Development, vol. 8, No. 1, Jan. 1969, pp. 51-56.
Spatocco, et al. Cost-based discovery for engineering solutions. pp. 1-43.
Supplemental Amendment After Final Rejection dated May 15, 2012 for U.S. Appl. No. 12/839,130.
The Colbert Report. Donald Sadoway interview. Oct. 22, 2012. http://www.colbertnation.com/full-episodes/mon-october-22/2012-donald-sadoway.
Villar, et al. Assessment of high-temperature self-assembling battery implementation based on the aluminum smelting process. Massachusetts Institute of Technology. Dept. of Materials Science and Engineering. Issue Date: 2010 http://hdl.handle.net/1721.1/62677.
Weaver, et al. The Sodium1Tin Liquid-Metal Cell. J. Electrochem. Soc., 109 (8), 653-657 (Aug. 1962).
Yu, et al. Determination of the Lithium Ion Diffusion Coefficient in Graphite. J. Electrochem. Soc. 1999 vol. 146, issue 1, 8-14.
Co-pending U.S. Appl. No. 15/136,337, filed Apr. 22, 2016.
Co-pending U.S. Appl. No. 15/289,857, filed Oct. 10, 2016.
European supplemental search report and opinion dated Mar. 16, 2017 for EP Application No. 14853610.
Fujiwara, et al. New molten salt systems for high temperature molten salt batteries: Ternary and quaternary molten salt systems based on LiF—LiCl, LiF—LiBr, and LiCl—LiBr. Journal of Power Sources. Apr. 15, 2011; 196(8):4012-4018.
International search report and written opinion dated Jun. 1, 2016 for PCT/US2016/019970.
International search report and written opinion dated Sep. 7, 2016 for PCT/US2016/021048.
Notice of allowance dated Apr. 11, 2017 for U.S. Appl. No. 14/688,214.
Notice of allowance dated Apr. 13, 2017 for U.S. Appl. No. 14/688,179.
Notice of allowance dated Aug. 22, 2016 for U.S. Appl. No. 14/536,549.
Notice of allowance dated Oct. 7, 2016 for U.S. Appl. No. 14/178,806.
Notice of allowance dated Mar. 22, 2017 for U.S. Appl. No. 14/536,563.
Office action dated May 1, 2017 for U.S. Appl. No. 14/678,602.
Office action dated Nov. 18, 2016 for U.S. Appl. No. 14/688,179.
Office action dated Nov. 22, 2016 for U.S. Appl. No. 14/688,214.
Shannon, Revised effective ionic radii and systematic studies of interatomic distances in halides and chalcogenides. Acta Crystallographica Section A: Crystal Physics, Diffraction, Theoretical and General Crystallography. Mar. 9, 1976, A32:751-767.
European search report and search opinion dated May 6, 2016 for EP Application No. 13847926.
European search report and search opinion dated May 13, 2016 for EP Application No. 13846301.
International preliminary report on patentability dated Apr. 28, 2016 for PCT Application No. PCT/US2014/060979.
International preliminary report on patentability dated Apr. 28, 2016 for PCT Application No. PCT/US2014/061266.
International preliminary report on patentability dated May 12, 2016 for PCT Application No. PCT/US2014/063222.
Office action dated Jun. 7, 2016 for U.S. Appl. No. 14/045,967.
Cerablak™ technology. Atfi Surface Science Solutions. http://www.atfinet.com/index.php/technology. Accessed Feb. 24, 2016.
Co-pending U.S. Appl. No. 15/063,842, filed Mar. 8, 2016.
Co-pending U.S. Appl. No. 15/130,129, filed Apr. 15, 2016.
Co-pending U.S. Appl. No. 15/130,292, filed Apr. 15, 2016.
Co-pending U.S. Appl. No. 15/140,434, filed Apr. 27, 2016.
International preliminary report on patentability dated Mar. 31, 2016 for PCT Application No. PCT/US2014/056367.
Notice of allowance dated Mar. 8, 2016 for U.S. Appl. No. 13/801,333.
Allanore, A. Features and Challenges of Molten Oxide Electrolytes for Metal Extraction. Journal of the Electrochemical Society, 162 (1): E13-E22 (2015). Published Nov. 25, 2014.
Allanore, et al. A new anode material for oxygen evolution in molten oxide electrolysis. Nature, vol. 497, May 16, 2013, pp. 353-356 and Online Methods Section. Published online May 8, 2013.
International preliminary report on patentability and written opinion dated Sep. 15, 2015 for PCT Application No. IB2014/000617.
International preliminary report on patentability and written opinion dated Nov. 24, 2015 for PCT Application No. US2014/039439.
Kim, et al. Electrolysis of Molten Iron Oxide with an Iridium Anode: The Role of Electrolyte Basicity. Journal of the Electrochemical Society, 158 (10) E101-E105 (2011). Published Aug. 5, 2011.
Kipouros, et al. Toward new technologies for the production of Lithium. JOM, May 1998, pp. 24-26.
Notice of allowance dated Jul. 31, 2015 for U.S. Appl. No. 13/801,333.
Notice of allowance dated Sep. 18, 2015 for U.S. Appl. No. 13/801,333.
Notice of allowance dated Dec. 11, 2015 for U.S. Appl. No. 13/801,333.
Nuvation BMS—Grid Energy Storage. Battery Management System for Grid Energy Storage. Accessed Nov. 11, 2015. http://www.nuvation.com/battery-management-system/bms-for-grid-energy-storage-platforms.
Nuvation BMS. Grid Battery Controller Battery Management Solution for Multi-Stack Grid-Scale Energy Storage Systems. 2015.
Office action—Requirement for Restriction Election dated Aug. 13, 2015 for U.S. Appl. No. 14/045,967.
Office action dated Feb. 5, 2016 for U.S. Appl. No. 14/536,549.
Office action dated Nov. 5, 2015 for U.S. Appl. No. 14/178,806.
Office action dated Nov. 9, 2015 for U.S. Appl. No. 14/286,369.
Office action dated Nov. 24, 2015 for U.S. Appl. No. 14/045,967.
Spatocco, et al. Low-Temperature Molten Salt Electrolytes for Membrane-Free Sodium Metal Batteries. Published Oct. 20, 2015, available at http://jes.ecsdl.org/content/162/14/A2729.full.pdf+html.
Sadoway, D. The Electrochemical Processing of Refractory Metals. JOM, Jul. 1991, pp. 15-19.
Sadoway, Donald R. A Technical Feasibility Study of Steelmaking by Molten Oxide Electrolysis Presentation. Presented at 9th AISI/DOE TRP Industry Briefing Session, Oct. 10, 2007, Salt Lake City. http://steeltrp.com/Briefing07slides/09-TRP9956_MIT-071BS.pdf.
Sadoway, Donald R. Electrochemical Pathways Towards Carbon-Free Metals Production Presentation. Presented at GCEP Carbon Management in Manufacturing Industries workshop, Apr. 15-16, 2008, Stanford University. http://gcep.stanford.edu/pdfs/2RK4ZjKBF2f71uM4uriP9g/SadowayGCEP_reduced.pdf.
Sadoway, Donald R. New opportunities for metals extraction and waste treatment by electrochemical processing in molten salts. J. Mater. Res., vol. 10, No. 3, Mar. 1995, pp. 487-492.

(56) References Cited

OTHER PUBLICATIONS

Sadoway, Donald R. New opportunities for waste treatment by electrochemical processing in molten salts. Metals and Materials Waste Reduction, Recovery and Remediation, Edited by K.C. Liddell, R.G. Bautista and R.J. Orth, The Minerals, Metals & Materials Society, 1994, pp. 73-76.
Salois, Gretchen. Pursuing Metal Purity. Aug. 26, 2013, Modern Metals Website. Accessed Sep. 18, 2015. http://www.modernmetals.com/item/11618-pursuing-metal-purity.html.
Sodium Sulfur-Battery Definition; Wikipedia website. Accessed Sep. 3, 2015. https://en.wikipedia.org/wiki/Sodium%E2%80%93sulfur_battery.
Written opinion of the International Search Authority dated Oct. 15, 2014 for PCT Application No. IB2014/000617.
Xue, et al. Ionic Liquid Redox Catholyte for high Energy Efficiency, Low-cost Energy Storage. Advanced Energy Materials 2015, vol. 5, Issue 12,1500271, Published online Apr. 17, 2015.
Li, et al. High Performance Liquid Metal Battery with Environmentally Friendly Antimony-Tin Positive Electrode. ACS Appl Mater Interfaces. May 25, 2016;8(20):12830-5. doi: 10.1021/acsami.6b02576. Epub May 5, 2016. With supporting information.
Li, et al. Liquid Metal Electrodes for Energy Storage Batteries. Advanced Energy Materials (2016) 6:1600483-1-19. DOI: 10.1002/aenm.201600483. Published May 31, 2016.
Notice of allowance dated Jul. 5, 2016 for U.S. Appl. No. 14/178,806.
Notice of allowance dated Jul. 25, 2016 for U.S. Appl. No. 14/286,369.
Office action dated Jun. 30, 2016 for U.S. Appl. No. 14/536,563.
Ouchi, et al. Calcium-based multi-element chemistry for grid-scale electrochemical energy storage. Nat Commun. Mar. 22, 2016;7:10999. doi: 10.1038/ncomms10999. With supplementary materials.
Co-pending U.S. Appl. No. 15/690,863, filed Aug. 30, 2017.
"Notice of allowance dated May 11, 2017 for U.S. Appl. No. 14/688,214".
"Notice of allowance dated Jul. 17, 2017 for U.S. Appl. No. 14/688,214".
"Notice of allowance dated Jul. 28, 2017 for U.S. Appl. No. 14/688,214".
"Notice of allowance dated Sep. 11, 2017 for U.S. Appl. No. 15/289,857".
"Notice of allowance dated Sep. 28, 2017 for U.S. Appl. No. 14/688,214".
Notice of allowance dated Oct. 4, 2017 for U.S. Appl. No. 15/136,337.
Notice of allowance dated Oct. 19, 2017 for U.S. Appl. No. 14/688,214.
McAlister, A. J. The Al—Li (Aluminum-Lithium) System. Bulletin of Alloy Phase Diagrams, vol. 3, No. 2, 1982, pp. 177-178. doi: 10.1007/BF02892377.
Zhang; et al. Pyrite FeS2 as an efficient adsorbent of lithium polysulfide for improved lithium-sulfur batteries. Journal of Materials Chemistry A, vol. 4, Feb. 23, 2016, pp. 4371-4374. doi: 10.1039/C6TA01214K. With supporting information.
Notice of allowance dated Jan. 11, 2018 for U.S. Appl. No. 15/136,337.
Notice of allowance dated Nov. 17, 2017 for U.S. Appl. No. 15/136,337.
Notice of allowance dated Dec. 20, 2017 for U.S. Appl. No. 15/136,337.
Notice of allowance dated Aug. 31, 2018 for U.S. Appl. No. 15/057,732.
Office action dated Mar. 27, 2018 for U.S. Appl. No. 15/140,434.
Office action dated Apr. 18, 2018 for U.S. Appl. No. 14/975,587.
Office action dated Apr. 20, 2018 for U.S. Appl. No. 15/057,732.
Office action dated Jun. 25, 2018 for U.S. Appl. No. 15/063,842.
Office action dated Nov. 13, 2017 for U.S. Appl. No. 14/678,602.

\* cited by examiner

A

B

C

A

B

ELECTROCHEMICAL ENERGY STORAGE DEVICES AND HOUSINGS

CROSS-REFERENCE

This application is a continuation application of PCT Application No. PCT/US2013/065086, filed Oct. 15, 2013, which claims the benefit of U.S. Provisional Patent Application Ser. No. 61/714,714, filed Oct. 16, 2012 and U.S. Provisional Patent Application Ser. No. 61/737,068, filed on Dec. 13, 2012, each of which is incorporated herein by reference in its entirety.

BACKGROUND

A battery is a device capable of converting stored chemical energy into electrical energy. Batteries are used in many household and industrial applications. In some instances, batteries are rechargeable such that electrical energy (e.g., converted from non-electrical types of energy, such as mechanical energy) is capable of being stored in the battery as chemical energy (i.e., charging the battery).

SUMMARY

The disclosure provides energy storage devices (e.g., batteries) and housings that may be used within an electrical power grid or as part of a standalone system. The batteries may be charged from an electricity production source, for later discharge when there is a demand for electrical energy consumption.

Energy storage devices of the disclosure aid in alleviating at least some of the issues with renewable energy sources. Renewable energy may be intermittent, where energy supply and demand may not be matched time-wise (e.g., within instantaneous or near-instantaneous timeframes). For example, solar energy is only produced when the sun is shining and wind energy is only produced when the wind is blowing. Further, demand at any given time is a function of industrial, commercial, community and household activity. Using the batteries and battery housings described herein can offer a means for balancing intermittent electrical energy supply with demand.

The disclosure provides systems for directing electrical current through a metallic wall at elevated temperatures while minimizing the introduction of leaks or electrical contacts between the current flow path and the wall. In some cases this is achieved through the use of a mated flange connection with mica, vermiculite, glass, brazed ceramics, or other high-temperature dielectric sealing material, and may be secured with electrically-insulating fasteners (e.g., bolts, clamps) or through the mechanical and/or chemical adhesion of the seal with the metal flange surfaces. The feed-through assembly may be sealed onto an appropriate opening in the metallic wall (e.g., through secure weld). In some instances, the feed-through assembly distributes current evenly across the electrode.

Bolted flange assemblies provided herein can provide a compressive force that may be adequate to seal a cavity of a housing of an energy storage device. In some cases, use of a flange assembly can also provide a geometry that is amenable to the use of mica or vermiculite gaskets as the sealant and electrical isolation material. In some implementations, the geometry of the sealing surface is decoupled from the geometry of the housing (or vessel) being sealed. The size and shape of the housing, in some cases, may not dictate the size and shape of the seal.

In an aspect, an electrochemical cell comprises an electrically conductive housing and a conductor in electrical communication with a current collector, wherein the conductor protrudes through the housing through an aperture in the housing and is electrically isolated from the housing, wherein the electrochemical cell is capable of storing and/or taking in at least 25 Wh of energy. In some embodiments, the electrochemical cell comprises a liquid metal anode adjacent to said current collector. In some embodiments, the liquid metal comprises lithium.

In another aspect, a battery comprises a plurality of the electrochemical cells of claim 1, wherein the battery is capable of storing at least 100 kWh of energy.

In another aspect, a battery housing comprises an electrically conductive container and a conductor in electrical communication with a current collector, wherein the conductor protrudes through the housing through an aperture in the container and is electrically isolated from the container, wherein the housing is capable of enclosing an electrochemical cell that is capable of storing and or taking in at least 25 Wh of energy. In some embodiments, the housing is capable of hermetically sealing the electrochemical cell.

In another aspect, an electrochemical cell comprises an electrically conductive housing and a conductor in electrical communication with a current collector, wherein the conductor protrudes through the housing through an aperture of the housing and is electrically isolated from the housing, wherein the ratio of the area of the aperture to the area of the housing is less than 0.1. In some embodiments, the cell comprises a liquid metal anode adjacent to said current collector. In some embodiments, the liquid metal comprises lithium. In some embodiments, the cell is capable of storing and or taking in at least 25 Wh of energy.

In another aspect, a battery housing comprises an electrically conductive container and a conductor in electrical communication with a current collector, wherein the conductor protrudes through the container through an aperture in the container and is electrically isolated from the container, wherein the ratio of the area of the aperture to the area of the container is less than 0.1 and wherein the housing is capable of enclosing a battery that is capable of storing and or taking in at least 25 Wh of energy.

In another aspect, an electrochemical energy storage device comprises a housing, a liquid metal electrode, a current collector in contact with the liquid metal electrode, and a plurality of conductors that are in electrical communication with the current collector and protrude through the housing through apertures in the housing. In some embodiments, the current is distributed substantially evenly across the liquid metal electrode. In some embodiments, the liquid metal electrode is in contact with an electrolyte along a surface and the current flowing across the surface is uniform. In some embodiments, the maximum density of current flowing across an area of the surface is less than about 150% of the average density of current flowing across the surface. In some embodiments, the minimum density of current flowing across an area of the surface is greater than about 50% of the average density of current flowing across the surface.

In another aspect, a battery housing comprises an electrically conductive container, a plurality of container apertures and a plurality of conductors in electrical communication with a current collector, wherein the conductors pass through the container apertures and are electrically isolated from the electrically conductive container, wherein the housing is capable of enclosing an electrochemical cell comprising a liquid metal electrode in contact with the current collector. In some embodiments, the current is distributed substantially evenly across the liquid metal electrode. In some embodiments, the liquid metal electrode is in contact with an electrolyte along a surface and the current flowing across the surface is uniform. In some embodiments, the maximum density of current flowing across an area of the surface is less than about 150% of the average density of current flowing across the surface. In some embodiments, the minimum density of current flowing across an area of the surface is greater than about 50% of the average density of current flowing across the surface.

In another aspect, an electrochemical energy storage device comprises a liquid metal anode and a cathode, wherein the electrochemical energy storage device is capable of storing and or taking in at least 25 Wh of energy and is hermetically or non-hermetically sealed. In some embodiments, the device is capable of storing at least 100 kWh of energy. In some embodiments, the electrochemical energy storage device comprises a liquid anode comprising lithium. In some embodiments, the rate of oxygen transfer into the electrochemical energy storage device is less than 0.5 mL per hour when the electrochemical energy storage device is contacted with air at a pressure of 1 bar and temperature of 500° C. In some embodiments, the electrochemical energy storage device comprises less than 15 bolts or fasteners. In some embodiments, the electrochemical energy storage device comprises no bolts or fasteners.

In another aspect, a compilation of electrochemical cells, an individual cell of said compilation comprising a liquid lithium anode in a charged state, wherein the compilation is capable of storing and or taking in at least 25 Wh of energy and each of the cells are hermetically sealed. In some embodiments, the compilation is capable of storing at least 100 kWh of energy.

In another aspect, a battery housing comprises an electrically conductive container, a container aperture and a conductor in electrical communication with a current collector, wherein the conductor passes through the container aperture and is electrically isolated from the electrically conductive container, wherein the housing is capable of hermetically sealing a battery which is capable of storing and or taking in at least 25 Wh of energy. In some embodiments, the housing is capable of hermetically sealing a battery which is capable of storing at least 100 kWh of energy. In some embodiments, the battery comprises a liquid metal anode adjacent to said current collector.

In another aspect, an energy storage device, comprises: a first electrochemical cell adjacent to a second electrochemical cell, each of said first and second cells comprising an electrically conductive housing and a conductor in electrical communication with a current collector, wherein the conductor is electrically isolated from the housing and protrudes through the housing through an aperture in the housing such that the conductor contacts the housing of an adjacent electrochemical cell of the energy storage device. In some embodiments, the first and/or second electrochemical cells comprise a liquid metal anode adjacent to said current collector. In some embodiments, the conductor contacts the housing of an adjacent electrochemical cell of the energy storage device when the first and second cells are in a stacked configuration. In some embodiments, the first and second cells are capable of storing and or taking in at least 25 Wh of energy. In some embodiments, the energy storage device comprises a stack of 1 to 10 electrochemical cells. In some embodiments, the energy storage device comprises a stack of 11 to 50 electrochemical cells. In some embodiments, the energy storage device comprises a stack of 51 to 100 electrochemical cells, or more.

In another aspect, a battery housing comprises an electrically conductive container and a conductor in electrical communication with a current collector, wherein the conductor protrudes through the housing through an aperture in the container and is electrically isolated from the container, wherein the conductor of a first housing contacts the container of a second housing when the first and second housings are in a stacked configuration. In some embodiments, the housing is capable of hermetically sealing an electrochemical cell comprises a liquid metal electrode. In some embodiments, the housing is capable of hermetically sealing an electrochemical cell capable of storing and or taking in at least 25 Wh of energy.

In another aspect, an electrochemical energy storage device comprises an anode, a cathode, an electrolyte, a positive current collector and a negative current collector, wherein the negative current collector is in contact with the anode and the positive current collector is in contact with the cathode, wherein the electrolyte is disposed in-between said anode and cathode, and wherein the electrochemical energy storage device is capable of storing and or taking in at least 25 Wh of energy and comprises less than 15 bolts or fasteners. In some embodiments, the device is capable of storing at least 100 kWh of energy. In some embodiments, the electrochemical energy storage device comprises less than 5 bolts or fasteners. In some embodiments, the electrochemical energy storage device comprises no bolts or fasteners. In some embodiments, the electrochemical energy storage device comprises a liquid metal anode adjacent to said current collector.

In another aspect, a compilation of electrochemical cells, an individual cell of said compilation comprising a liquid lithium anode in a charged state, wherein the compilation is capable of storing and or taking in at least 25 Wh of energy and each of the batteries comprise less than 10 bolts or fasteners. In some embodiments, the compilation is capable of storing at least 100 kWh of energy.

In another aspect, a battery housing that hermetically seals an electrochemical energy storage device having a liquid metal anode, which electrochemical energy storage device is capable of storing and or taking in at least 25 Wh of energy, wherein the battery housing comprises less than 10 bolts or fasteners. In some embodiments, the housing is capable of hermetically sealing an electrochemical energy storage device capable of storing at least 100 kWh of energy.

In another aspect, an electrochemical cell comprises an electrically conductive housing and a conductor in electrical communication with a current collector, wherein the conductor protrudes through the housing through an aperture in the housing and is electrically isolated from the housing with a gasket, wherein the force on the gasket is at least 5,000 psi when the housing is sealed. In some embodiments, the force on the gasket is at least 10,000 psi when the housing is sealed. In some embodiments, the gasket is affixed with a flange and no more than 10 bolts or fasteners. In some embodiments, the gasket is adhesive and the cell comprises no bolts or fasteners.

In another aspect, a battery housing comprises an electrically conductive container and a conductor in electrical communication with a current collector, wherein the conductor protrudes through the container through an aperture in the container and is electrically isolated from the container with a gasket, wherein the force on the gasket is at least 5,000 psi when the battery housing is sealed. In some embodiments, the force on the gasket is at least 10,000 psi when the battery housing is sealed. In some embodiments, the gasket is affixed with a flange and no more than 10 bolts or fasteners. In some embodiments, the housing is capable of enclosing an electrochemical cell that is capable of storing and or taking in at least 25 Wh of energy. In some embodiments, the housing is capable of hermetically or non-hermetically sealing the battery.

In another aspect, an electrochemical battery housing, comprises: (a) a container including a cavity that extends into the container from a cavity aperture; (b) a container lid assembly sealing the cavity, the lid assembly including an electrically conductive container lid and an electrically conductive flange, wherein the container lid covers the cavity aperture and includes a conductor aperture that extends through the container lid, and wherein the flange covers the conductor aperture and is electrically isolated from the container lid; and (c) an electrical conductor connected to the flange and extending through the conductor aperture into the cavity, wherein the conductor is electrically isolated from the container lid.

In some embodiments, (a) the conductor aperture is one of a plurality of conductor apertures extending through the container lid; (b) the flange is one of a plurality of electrically conductive flanges respectively covering the conductor apertures and electrically isolated from the container lid; and/or (c) the conductor is one of a plurality of electrical conductors respectively connected to the flanges, respectively extending through the conductor apertures, and electrically isolated from the container lid. In some embodiments, the housing further comprises a current collector within the cavity and connected to the conductors. In some embodiments, the housing further comprises a gasket arranged between and electrically isolating the flange and the container lid. In some embodiments, the gasket comprises dielectric material. In some embodiments, the container lid is fixedly and/or securely connected to the container, and the flange is removably connected to the container lid. In some embodiments, the container lid includes a mounting ring connected to a base, and the conductor aperture extends through the mounting ring, and wherein the flange is removably connected to the mounting ring with a plurality of fasteners. In some embodiments, portions of the fasteners that engage the mounting ring are electrically isolated from the mounting ring. In some embodiments, the fasteners are electrically isolated from the flange by dielectric material. In some embodiments, the housing further comprises an insulating sheath attached to an interior sidewall surface of the container. In some embodiments, the container has one of a circular cross-sectional geometry and a rectangular cross-sectional geometry. In some embodiments, the cavity aperture has a cavity aperture diameter, and wherein the conductor aperture has a conductor aperture diameter that is about two (2) times less than that cavity aperture diameter. In some embodiments, the container lid assembly hermetically seals said cavity.

In another aspect, an electrochemical battery, comprises: (a) a container including a cavity that extends into the container from a cavity aperture; (b) an electrochemical battery cell arranged within the cavity; (c) a container lid assembly sealing the battery cell in the cavity, the lid assembly including an electrically conductive container lid and an electrically conductive flange, wherein the container lid covers the cavity aperture and includes a conductor aperture that extends through the container lid, and wherein the flange covers the conductor aperture and is electrically isolated from the container lid; and (d) an electrical conductor extending through the conductor aperture, and electrically coupled to the battery cell and the flange, wherein the conductor is electrically isolated from the container lid. In some embodiments, the battery cell comprises a liquid electrolyte arranged between a negative liquid metal electrode and a positive liquid metalloid electrode. In some embodiments, the battery further comprises a current collector electrically coupled to the negative liquid metal electrode, wherein the current collector is connected to the conductor which is connected to the top flange in the assembly, which is electrically isolated from the cell lid.

In some embodiments, (a) the conductor aperture is one of a plurality of conductor apertures extending through the container lid; (b) the flange is one of a plurality of electrically conductive flanges respectively covering the conductor apertures and electrically isolated from the container lid; and/or (c) the conductor is one of a plurality of electrical conductors respectively electrically coupled to the battery cell and the flanges, respectively extending through the conductor apertures, and electrically isolated from the container lid. In some embodiments, the battery further comprises a gasket arranged between and electrically isolating the flange and the container lid. In some embodiments, the gasket comprises dielectric material. In some embodiments, the container lid includes a mounting ring connected to a base that is fixedly and/or securely connected to the container, and the conductor aperture extends through the mounting ring, and wherein the flange is removably connected to the mounting ring with a plurality of bolts or fasteners. In some embodiments, the container lid assembly hermetically or non-hermetically seals said battery cell in said cavity.

In another aspect, an electrochemical cell comprises an electrically conductive housing and a conductor in electrical communication with a current collector, wherein the conductor protrudes through the housing through an aperture in the housing and is electrically isolated from the housing with a seal that hermetically seals the electrochemical cell. In some embodiments, the seal is formed by brazing ceramic onto a metal substrate. In some embodiments, the seal is formed by mechanically and/or chemically bonded glass or glass-ceramic composite. In some embodiments, the seal is formed between dissimilar materials. In some embodiments, the seal is under compression at the operating temperature of the electrochemical cell. In some embodiments, the seal is formed between two surfaces in at least two planes. In some embodiments, the seal is formed from at least two different materials, at least one of which is resistant to degradation from contact with materials contained in the electrochemical cell.

In another aspect, a method for sealing an electrochemical cell comprises: (a) applying a sealant material between a housing and an article recessed into the housing, wherein the sealant is applied at a temperature at which the sealant material is malleable, viscous, or flowable, and wherein the housing and the article have different coefficients of thermal expansion; and (b) lowering the temperature to a temperature at which the sealant material is not malleable, viscous, or flowable, thereby creating a seal between the housing and the article that is under a compressive force. In some embodiments, the sealant material is a borosilicate glass. In some embodiments, the housing has a greater coefficient of thermal expansion than the article. In some embodiments, the seal is resistant to reactive metal vapors such as sodium (Na), lithium (Li) or magnesium (Mg). In some embodiments, the sealant material is a chalcogenide based compound. In some embodiments, the chalcogenide has the chemical formula $CaAl_2S_4$.

In another aspect, an electrochemical cell comprises an electrically conductive housing as a first current collector and a conductor in electrical communication with a second current collector, wherein the conductor protrudes through the housing through an aperture in the housing and is electrically isolated from the housing. In some embodiments, the electrochemical cell comprises a liquid metal anode adjacent to the first current collector or the second current collector.

In some embodiments, the liquid metal comprises lithium.

In another aspect, a battery comprises one or more electrochemical cells as described herein, wherein the battery is capable of storing at least 25 Wh of energy. In some embodiments, the battery is capable of storing at least 100 kWh of energy.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "Figure" or "FIG." herein), of which:

FIG. 21 is a cross-sectional illustration of a seal of an electrochemical cell with a recessed conductive feed-through;

FIG. 22 is an exploded view illustration of a seal of an electrochemical cell with a recessed conductive feed through; and FIG. 23 is a top view illustration of the components of a seal of an electrochemical cell with a recessed conductive feed through.

DETAILED DESCRIPTION

Figure 1:
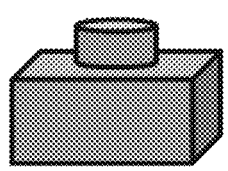
FIG. 1 is a illustration of an electrochemical cell (A) and a compilation (i.e., battery) of electrochemical cells (B and C)
Figure 1:
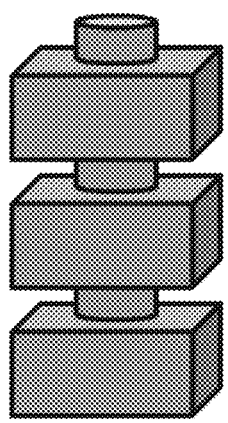
Figure 1:
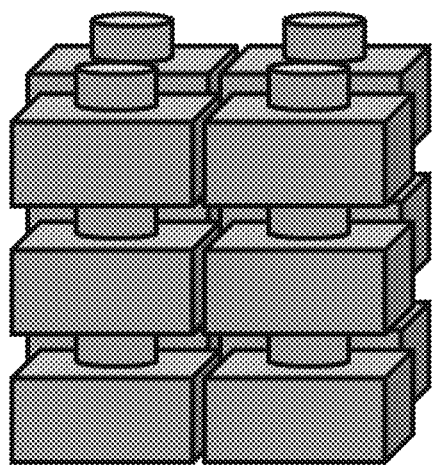

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

This disclosure provides electrochemical energy storage devices (or batteries) and electrochemical battery housings. An electrochemical battery can include an electrochemical battery cell sealed (e.g., hermetically sealed) within an electrochemical battery housing.

Electrochemical Cells and Housings

The term "cell," as used herein, generally refers to an electrochemical cell. A cell can include a negative electrode of material 'A' and a positive electrode of material 'B', denoted as A∥B. The positive and negative electrodes can be separated by an electrolyte.

The term "module," as used herein, generally refers to cells that are attached together in parallel by, for example, mechanically connecting the cell housing of one cell with the cell housing of an adjacent cell (e.g., cells that are connected together in an approximately horizontal packing plane). A module can include a plurality of cells in parallel. A module can comprise any number of cells (e.g., 2, 3, 4, 5, 6, 7, 8, 9, 10, 11, 12, 13, 14, 15, 16, 17, 18, 19, 20, or more). In some cases, a module comprises 9, 12, or 16 cells. In some cases, a module is capable of storing about 700 Watt-hours of energy and/or delivering about 175 Watts of power.

The term "pack," as used herein, generally refers to modules that are attached through different electrical connections (e.g., vertically). A pack can comprise any number of modules (e.g., 1, 2, 3, 4, 5, 6, 7, 8, 9, 10, 11, 12, 13, 14, 15, 16, 17, 18, 19, 20, or more). In some cases, a pack comprises 3 modules. In some cases, a pack is capable of storing about 2 kilo-Watt-hours of energy and/or delivering about 0.5 kilo-Watts of power.

The term "core," as used herein generally refers to a plurality of modules or packs that are attached through different electrical connections (e.g., in series and/or parallel). A core can comprise any number of modules or packs (e.g., 1, 2, 3, 4, 5, 6, 7, 8, 9, 10, 11, 12, 13, 14, 15, 16, 17, 18, 19, 20, or more). In some cases, the core also comprises mechanical, electrical, and thermal systems that allow the core to efficiently store and return electrical energy in a controlled manner. In some cases, a core comprises 12 packs. In some cases, a core is capable of storing about 25 kilo-Watt-hours of energy and/or delivering about 6.25 kilo-Watts of power.

The term "pod," as used herein, generally refers to a plurality of cores that are attached through different electrical connections (e.g., in series and/or parallel). A pod can comprise any number of cores (e.g., 1, 2, 3, 4, 5, 6, 7, 8, 9, 10, 11, 12, 13, 14, 15, 16, 17, 18, 19, 20, or more). In some cases, the pod contains cores that are connected in parallel with appropriate by-pass electronic circuitry, thus enabling a core to be disconnected while continuing to allow the other cores to store and return energy. In some cases, a pod comprises 4 cores. In some cases, a pod is capable of storing about 100 kilo-Watt-hours of energy and/or delivering about 25 kilo-Watts of power.

The term "system," as used herein, generally refers to a plurality of cores or pods that are attached through different electrical connections (e.g., in series and/or parallel). A system can comprise any number of cores or pods (e.g., 2, 3, 4, 5, 6, 7, 8, 9, 10, 11, 12, 13, 14, 15, 16, 17, 18, 19, 20, or more). In some cases, a system comprises 20 pods. In some cases, a system is capable of storing about 2 megawatt-hours of energy and/or delivering about 500 kilowatts of power.

The term "battery," as used herein, generally refers to one or more electrochemical cells connected in series and/or parallel. A battery can comprise any number of electrochemical cells, modules, packs, cores, pods or systems.

Electrochemical cells of the disclosure may include an anode, an electrolyte adjacent to the anode, and a cathode adjacent to the electrolyte. In some examples, an electrochemical cell is a liquid metal battery cell. A liquid metal battery cell may include a liquid electrolyte separator arranged between a negative liquid (e.g., molten) metal electrode and a positive liquid metalloid electrode. In some embodiments, a liquid metal battery cell has a molten alkali metal (e.g., lithium) anode, an electrolyte, and a molten metal (e.g. lead, lead-antimony alloy) cathode.

To maintain the electrodes in the liquid states, the battery cell may be heated to any suitable temperature. In some embodiments, the battery cell is heated to a temperature of about 200° C., about 250° C., about 300° C., about 350° C., about 400° C., about 450° C., about 500° C., about 550° C., about 600° C., about 650° C., or about 700° C. The battery cell may be heated to a temperature of at least about 200° C., at least about 250° C., at least about 300° C., at least about 350° C., at least about 400° C., at least about 450° C., at least about 500° C., at least about 550° C., at least about 600° C., at least about 650° C., or at least about 700° C. In some situations, the battery cell is heated to between 200° C. and about 500° C., between 200° C. and about 700° C. or between about 300° C. and 450° C.

Electrochemical cells of the disclosure may be adapted to cycle between charged (or energy storage) modes and discharged (or energy depleted) modes. In some examples, an electrochemical cell can be fully charged, partially discharged, or fully discharged.

In some implementations, during a charging mode, electrical current received from an external power source (e.g., a generator or an electrical grid) may cause metal atoms in the metalloid cathode to shed one or more electrons, dissolving into the electrolyte as a positively charged ion (i.e., cation). Simultaneously, cations of the same species can migrate through the electrolyte, and may accept electrons at the anode, causing them to transition to a neutral metal species, adding to the mass of the electrode. The removal of the active metal species from the cathode and the addition of the active metal to the anode stores electrical potential energy. During an energy discharge mode, an electrical load is coupled to the electrodes. The previously added metal species in the anode are released from the metal electrode (e.g. through melting), and pass through the electrolyte as ions. These ions in the electrolyte alloy with the cathode, with the flow of ions accompanied by the external and matching flow of electrons through the external circuit/load. This electrochemically facilitated metal alloying reaction discharges the previously stored electrical potential energy to the electrical load.

In a charged state, the anode can include anode material and the cathode can include cathode material. During discharging (e.g., when the battery is coupled to a load), the anode material yields one or more electrons and cations of the anode material. The cations migrate through the electrolyte to the cathode material and react with the cathode material to form an metal or metal alloy. During charging, the alloy disassociates to yield cations of the anode material, which migrates to the anode.

Electrochemical cells of the disclosure can include housings that may be suited for various uses and operations. A battery housing can be configured to electrically couple the electrodes to a switch, which is connected to the external power source and the electrical load. The battery cell housing may include, for example, an electrically conductive container that is electrically coupled to a first pole of the switch and/or another cell housing, and an electrically conductive container lid that is electrically coupled to a second pole of the switch and/or another cell housing. The container can be an electrode of the battery cell. The battery cell can be arranged within a cavity of the battery container. One of the electrodes contacts and/or is in electrical communication with an endwall of the battery container. A ceramic sheath may electrically insulate remaining portions of the battery cell from other portions of the battery container. A conductor electrically couples a second one of the electrodes to the container lid, which can seal (e.g., hermetically or non-hermetically) the battery cell within the cavity.

Batteries and Housings

A battery, as used herein can comprise a plurality of electrochemical cells. With reference to FIG. 1, an electrochemical cell (A) is a unit comprising an anode and a cathode. The cell may comprise an electrolyte and be sealed in a housing as described herein. In some cases, the electrochemical cells can be stacked (B) to form a battery (i.e., a compilation of electrochemical cells). The cells can be arranged in parallel, in series, or in both parallel and series (C). The cells can be made into different shapes and geometries that may differ from what is depicted.

Electrochemical cells of the disclosure may be capable of storing (and/or taking in) a suitably large amount of energy. In some instances, a cell is capable of storing (and/or taking in) about 1 Wh, about 5 Wh, 25 Wh, about 50 Wh, about 100 Wh, about 500 Wh, about 1 kWh, about 1.5 kWh, about 2 kWh, about 3 kWh, or about 5 kWh. In some instances, the battery is capable of storing (and/or taking in) at least about 1 Wh, at least about 5 Wh, at least about 25 Wh, at least about 50 Wh, at least about 100 Wh, at least about 500 Wh, at least about 1 kWh, at least about 1.5 kWh, at least about 2 kWh, at least about 3 kWh, or at least about 5 kWh. It is recognized that the amount of energy stored in an electrochemical cell and/or battery may be less than the amount of energy taken into the electrochemical cell and/or battery (e.g., due to inefficiencies and losses).

The compilation of cells (i.e., battery) can include any suitable number of cells, such as at least about 2, at least about 5, at least about 10, at least about 50, at least about 100, at least about 500, at least about 1000, at least about 5000, at least about 10000, and the like. In some examples, a battery includes 1, 2, 3, 4, 5, 6, 7, 8, 9, 10, 15, 20, 30, 40, 50, 60, 70, 80, 90, 100, 200, 300, 400, 500, 600, 700, 800, 900, 1000, 2000, 5000, 10,000, 20,000, 50,000, 100,000, 500,000, or 1,000,000 cells.

Batteries of the disclosure may be capable of storing a suitably large amount of energy for use with a power grid (i.e., a grid-scale battery) or other loads or uses. In some instances, a battery is capable of storing (and/or taking in) about 5 kWh, 25 kWh, about 50 kWh, about 100 kWh, about 500 kWh, about 1 MWh, about 1.5 MWh, about 2 MWh, about 3 MWh, or about 5 MWh. In some instances, the battery is capable of storing (and/or taking in) at least about 5 kWh, at least about 25 kWh, at least about 50 kWh, at least about 100 kWh, at least about 500 kWh, at least about 1 MWh, at least about 1.5 MWh, at least about 2 MWh, at least about 3 MWh, or at least about 5 MWh.

In some instances, the cells and cell housings are stackable. Any suitable number of cells can be stacked. Cells can be stacked side-by-side, on top of each other, or both. In some instances, at least about 10, 50, 100, or 500 cells are stacked. In some cases, a stack of 100 cells is capable of storing at least 50 kWh of energy. A first stack of cells (e.g., 10 cells) can be electrically connected to a second stack of cells (e.g., another 10 cells) to increase the number of cells in electrical communication (e.g., 20 in this instance). In some instances, the energy storage device comprises a stack of 1 to 10, 11 to 50, 51 to 100, or more electrochemical cells.

Cell Lid Assemblies

An electrochemical cell can be housed in a container, which can include a container lid. In some cases, the container is an electrode of the electrochemical cell. The container lid may utilize, for example, a seal or gasket (e.g., annular dielectric gasket) to electrically isolate the battery container from the container lid. Such a gasket may be constructed from a relatively hard electrically insulating material, such as, for example, glass, silicon oxide, aluminum oxide, boron nitride, aluminum nitride, or other oxides comprising of lithium oxide, calcium oxide, barium oxide, yttrium oxide, silicon oxide, aluminum oxide, lithium nitride, or other ceramics. The gasket may be subject to relatively high compressive forces (e.g., greater than 10,000 psi) between the container lid and the battery container in order to provide the seal in addition to the electrical isolation. In order to subject the dielectric gasket to such high compressive forces, the fasteners may have relatively large diameters and may be closely spaced together. Such large diameter fasteners may be expensive and, thus, may significantly increase the cost to build a relatively large diameter battery container. In addition, as the diameter of the dielectric gasket is increased to accommodate a large diameter battery container, the gasket may become more and more fragile and difficult to maneuver.

Figure 2:
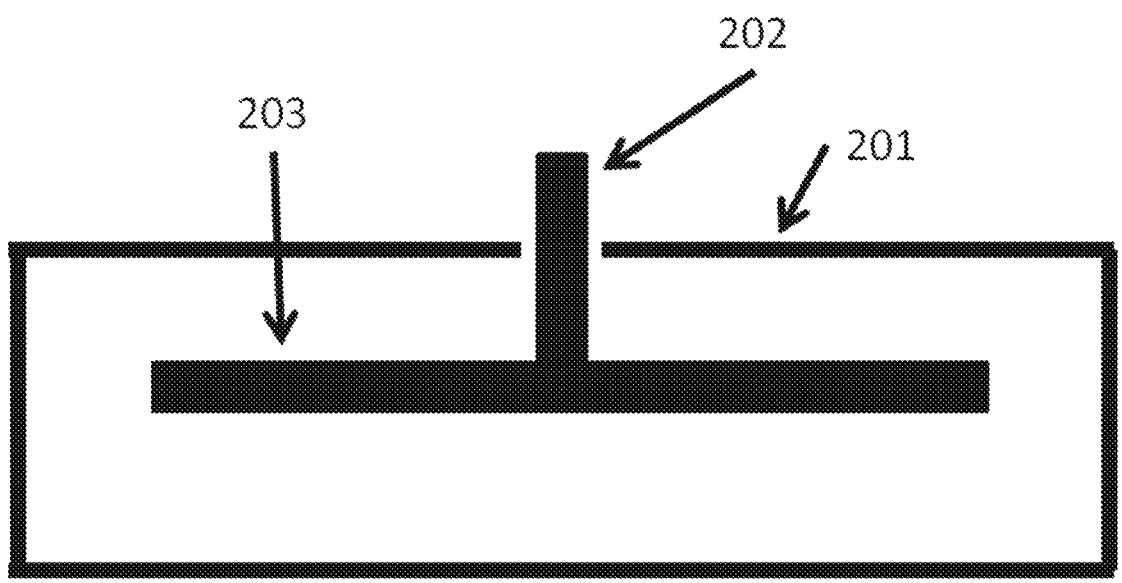
FIG. 2 is a schematic cross sectional illustration of a battery housing having a conductor in electrical communication with a current collector pass through an aperture in the housing.

With reference to FIG. 2, a battery comprises an electrically conductive housing 201 and a conductor 202 in electrical communication with a current collector 203. The conductor may be electrically isolated from the housing and may protrude through the housing through an aperture in the housing such that the conductor of a first cell contacts the housing of a second cell when the first and second cells are stacked.

In an aspect, a cell housing comprises an electrically conductive container and a conductor in electrical communication with a current collector. The conductor may protrude through the housing through an aperture in the container and is electrically isolated from the container. The conductor of a first housing may contact the container of a second housing when the first and second housings are stacked.

In some instances, the area of the aperture through which the conductor protrudes from the housing and/or container is small relative to the area of the housing and/or container. In some cases, the ratio of the area of the aperture to the area of the housing is about 0.001, about 0.005, about 0.01, about 0.05, about 0.1, about 0.15, about 0.2, about 0.3, about 0.4, or about 0.5. In some cases, the ratio of the area of the aperture to the area of the housing is less than 0.001, less than 0.005, less than 0.01, less than 0.05, less than 0.1, less than 0.15, less than 0.2, less than 0.3, less than 0.4, or less than 0.5.

In an aspect, a cell comprises an electrically conductive housing and a conductor in electrical communication with a current collector. The conductor protrudes through the housing through an aperture in the housing and may be electrically isolated from the housing. The ratio of the area of the aperture to the area of the housing may be less than about 0.1.

In an aspect, a cell housing comprises an electrically conductive container and a conductor in electrical communication with a current collector. The conductor protrudes through the container through an aperture in the container and is electrically isolated from the container. The ratio of the area of the aperture to the area of the container may be less than 0.1. The housing can be capable of enclosing a cell that is capable of storing and or taking in at least 25 Wh of energy.

Figure 3:
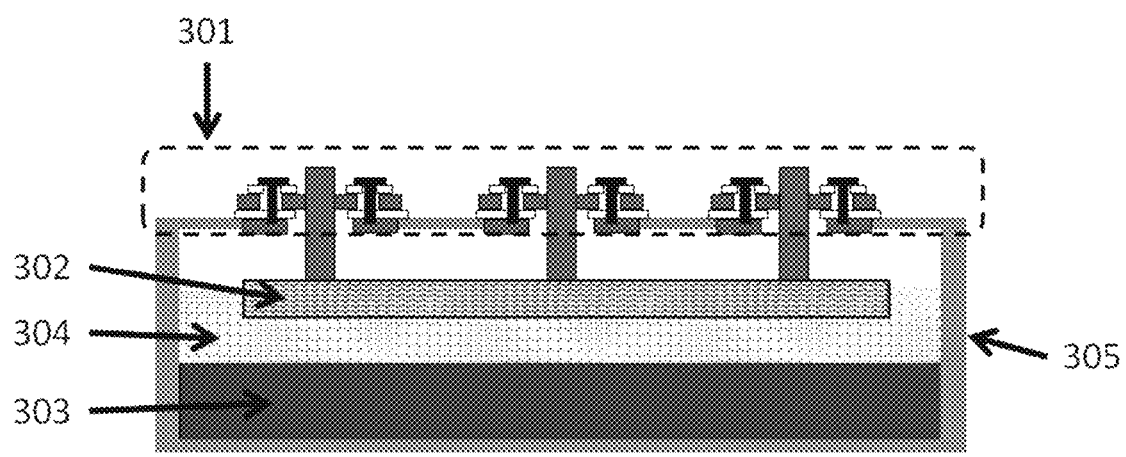
FIG. 3 is a schematic cross sectional illustration of an electrochemical cell.

In some instances, the conductor is electrically isolated from the housing with a gasket or seal. FIG. 3 shows a cell lid assembly 301 that can be welded onto a container 305. At least one conductive feed-through (i.e., conductor) passes through the lid assembly and is in electrical communication with a liquid anode 302. In some embodiments, the current collector is an electrically conductive foam, wherein the anode comprises a liquid metal (e.g. lithium, magnesium, sodium). The anode is in contact with a molten salt electrolyte 304, which is in contact with a liquid metal cathode 303. In some embodiments the liquid metal cathode comprises lead and antimony.

Figure 4:
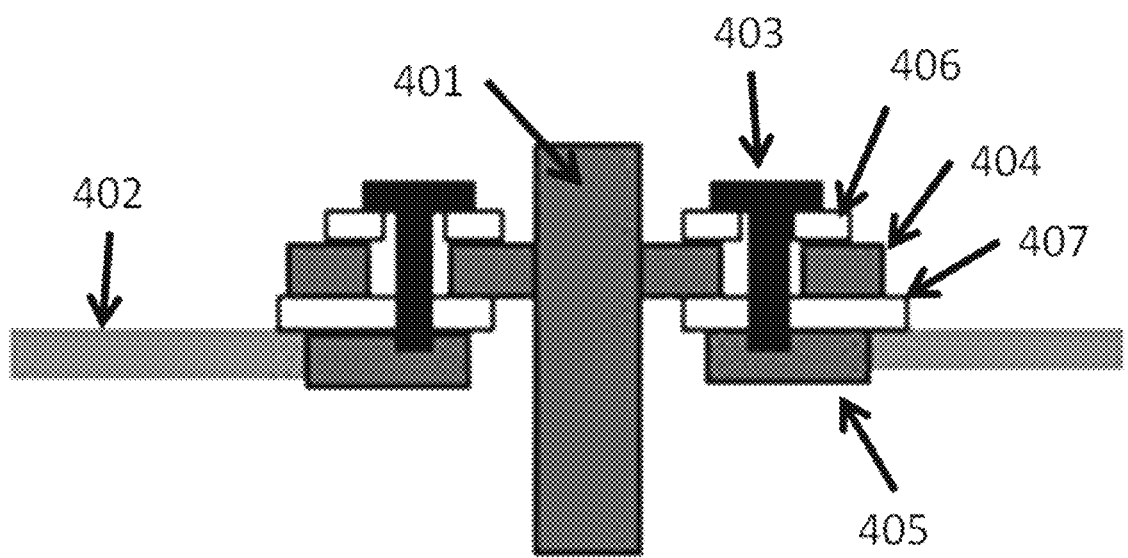
FIG. 4 is a schematic cross sectional illustration of an embodiment of a cell lid assembly.

FIG. 4 shows a conductor 401, housing aperture and associated structures for electrically isolating the conductor from the housing 402 and sealing the electrochemical cell. In some embodiments, at least one bolt 403 holds the assembly in place. The bolt can be in electrical communication with the housing and electrically insulated from the conductive feed-through. In some embodiments, the bolt compresses a top flange 404 with a bottom flange 405. The bottom flange is welded to the cell lid in some instances. An electrically insulating washer or washer assembly 406 can insulate the bolt from the top flange. In some cases, a dielectric gasket 407 insulates the top flange from the bottom flange. A dielectric sheath (not shown) can be used to prevent the bolt from contacting the top flange in some cases. In some cases, the feed-through conductor has negative polarity (e.g., is in electrical communication with the anode) and the bolts and housing have positive polarity (e.g., is in electrical communication with the cathode).

When sealed, the force applied to the gasket can be about 1,000 psi, about 2,000 psi, about 5,000 psi, about 10,000 psi, about 15,000 psi, or about 30,000 psi. In some instances, the force applied to the gasket is at least 1,000 psi, at least 2,000 psi, at least 5,000 psi, at least 10,000 psi, at least 15,000 psi, or at least 30,000 psi.

In some cases, a cell comprises an electrically conductive housing and a conductor in electrical communication with a current collector. The conductor can protrude through the housing through an aperture in the housing and is electrically isolated from the housing with a gasket. The force on the gasket may be at least 1,000 psi, at least 5,000 psi, at least 10,000 psi, and the like.

A cell housing can comprise an electrically conductive container and a conductor in electrical communication with a current collector. The conductor may protrude through the container through an aperture in the container and may be electrically isolated from the container with a gasket. The force on the gasket can be at least 1,000 psi, at least 5,000 psi, at least 10,000 psi, and the like.

Few Bolts and Fasteners

Bolts and fasteners can add to the cost of the battery and/or housing substantially. In some instances, the battery or battery housing comprises few bolts or fasteners. In some embodiments, the battery or housing comprises about 50, about 40, about 30, about 20, about 10, about 5, or about 2 bolts or fasteners. The battery or battery housing may comprise no bolts or fasteners. In some embodiments, the battery or housing comprises less than 50, less than 40, less than 30, less than 20, less than 10, less than 5, or less than 2 bolts or fasteners. In other embodiments, the dielectric sealing material may be mechanically and/or chemically adhered to the surfaces of the cell lid and the feed through leads, allowing the system to achieve a hermetic gas-tight seal without the need for any bolts or fasteners on the cell. Pressure may also be applied to the top of the feed-through, such as through cell stacking or adding a weight to the top of the cell, improving the performance and durability of the seal.

A battery can comprise an anode, a cathode, an electrolyte, a positive current collector, and a negative current collector. The negative current collector can be in contact with the anode and the positive current collector is in contact with the cathode. The battery can be capable of storing and or taking in at least 25 Wh of energy and comprises less than 10 bolts or fasteners.

In some cases, a compilation of cells is capable of storing at least 25 Wh, 200 Wh, 300 Wh, 400 Wh, 500 Wh, 600 Wh, 700 Wh, 800 Wh, 900 Wh, 1,000 Wh, 2,000 Wh, 3,000 Wh, 4,000 Wh, 4,000 Wh, 5,000 Wh, 6,000 Wh, 7,000 Wh, 8,000 Wh, 9,000 Wh, 10,000 Wh, 20,000 Wh, 30,000 Wh, 40,000 Wh, or 50,000 Wh of energy, and each of the cells comprises less than 20, 15, 14, 13, 12, 11, 10, 9, 8, 7, 6, 5, 4, 3, 2, or 1 bolt(s) or fastener(s). In some examples, cell components can be welded to one another.

A cell housing can be capable of hermetically sealing a cell which is capable of storing and or taking in at least 25 Wh of energy. The housing comprises less than 20, 15, 14, 13, 12, 11, 10, 9, 8, 7, 6, 5, 4, 3, 2, or 1 bolt(s) or fastener(s).

Figure 5:
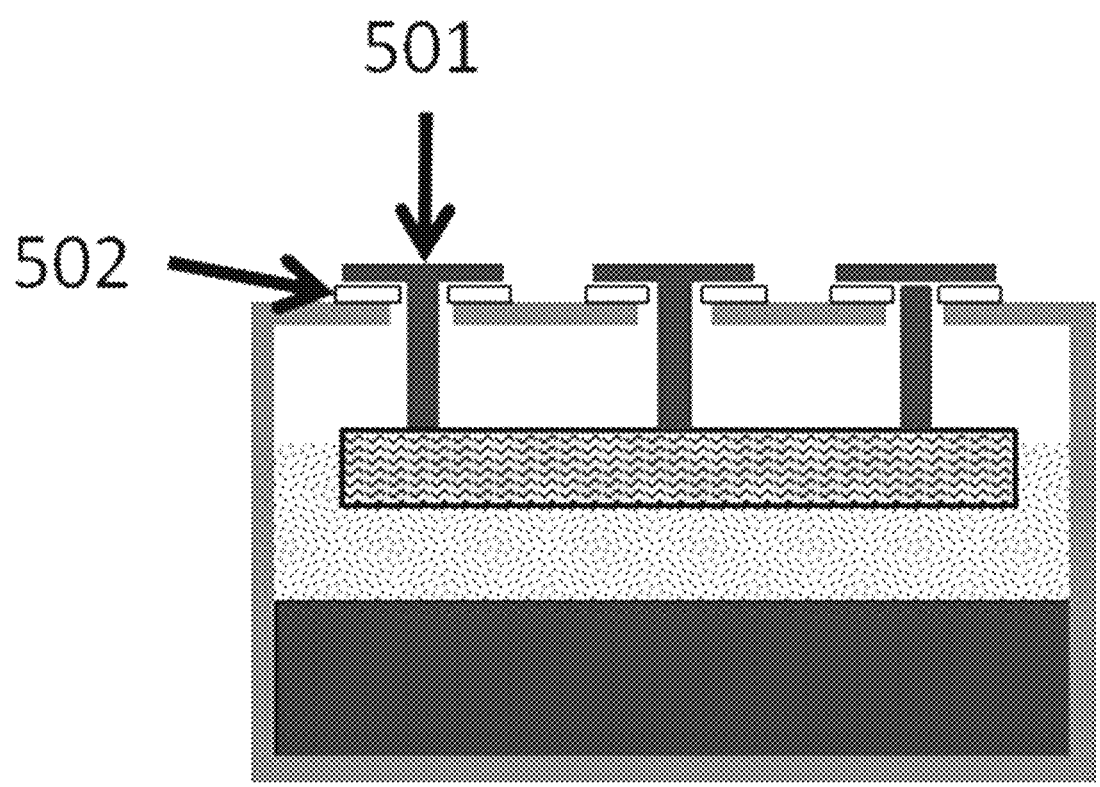
FIG. 5 is a schematic cross sectional illustration of an electrochemical cell having feed-throughs that are electrically insulated from a housing with a dielectric seal components.

Cell lid assemblies can use adhesive seals instead of flanges and gaskets. In some cases, adhesive seals eliminate bolts from the electrochemical cell housing. As seen in FIG. 5, the conductive feed-through 501 is electrically isolated from the housing and the housing is sealed by an adhesive sealing material 502 disposed between the feed-through and the housing.

In some cases, for cells that are sealed with adhesive dielectric seals that do not use bolts, a pressure of less than 1 psi may be all that is required to maintain a gas tight seal. In some cases, at least part of the pressure can be supplied by the weight of one or more electrochemical cells stacked upon each other in a battery. The adhesive seal material can comprise a glass seal or a brased ceramic, such as Alumina with Cu—Ag braze alloy, or other ceramic-braze combination.

Sealing the electrochemical cell with an adhesive material rather than bolts and flanges can reduce the height at which the lid assembly can extend above the housing ("head space"). In a stacked battery configuration, it may be desirable to reduce the head space so that relatively more of the volume of the battery can comprise anode and cathode material (i.e., a higher energy storage capacity). In some instances, the width of the head space (as measured from the top of the feed-through to the top surface of the anode) is a small fraction of the width of the battery (as measured from the top of the feed-through to the bottom surface of the housing). In some embodiments, the head space is about 5%, about 10%, about 15%, about 20%, or about 25% of the height of the battery. In some embodiments, the head space is at most about 5%, at most about 10%, at most about 15%, at most about 20%, or at most about 25% of the height of the battery.

In some embodiments, the combined volume of anode and cathode material is about 50%, about 60%, about 70%, about 80%, about 90%, or about 95% of the volume of the battery (e.g., as defined by the outer-most housing of the battery, such as a shipping container). In some embodiments, the combined volume of anode and cathode material is at least about 50%, at least about 60%, at least about 70%, at least about 80%, at least about 90%, or at least about 95% of the volume of the battery.

In some situations, the use of a few or only a single conductive feed-through can result in uneven current distribution in the electrode. As described herein, a plurality of conductive feed-throughs can more evenly distribute the current in the electrode.

In an aspect, an electrochemical energy storage device comprises a housing, a liquid metal electrode, a current collector in contact with the liquid metal electrode, and a plurality of conductors that are in electrical communication with the current collector and protrude through the housing through apertures in the housing. In some embodiments, current is distributed substantially evenly across the liquid metal electrode.

In some embodiments, the liquid metal electrode is in contact with an electrolyte along a surface (and/or interface) and the current flowing across the surface (and/or interface) is uniform. The current flowing through any portion of the surface (and/or interface) does not deviate far from the average current. In some embodiments, the maximum density of current flowing across an area of the surface (and/or interface) is less than about 105%, less than about 115%, less than about 125%, less than about 150%, less than about 175%, less than about 200%, less than about 250%, or less than about 300% of the average density of current flowing across the surface (and/or interface). In some embodiments, the minimum density of current flowing across an area of the surface (and/or interface) is greater than about 50%, greater than about 60%, greater than about 70%, greater than about 80%, greater than about 90%, or greater than about 95% of the average density of current flowing across the surface (and/or interface).

Figure 6:
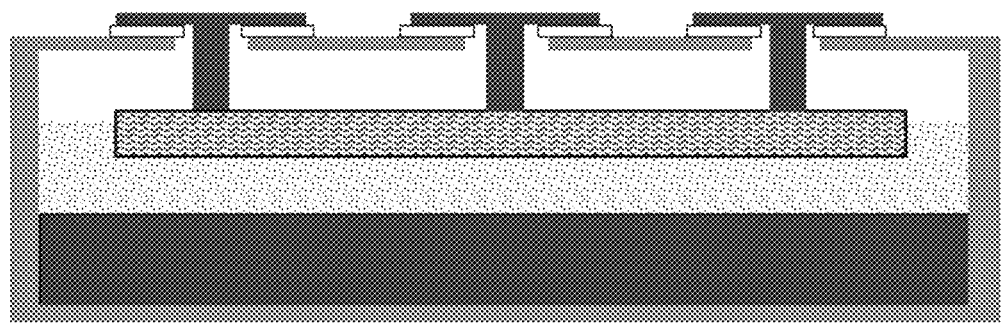
FIG. 6, panels A & B, show that the current collector can be combined into a shared lid assembly and the invention can be used with cells of any size.
Figure 6:
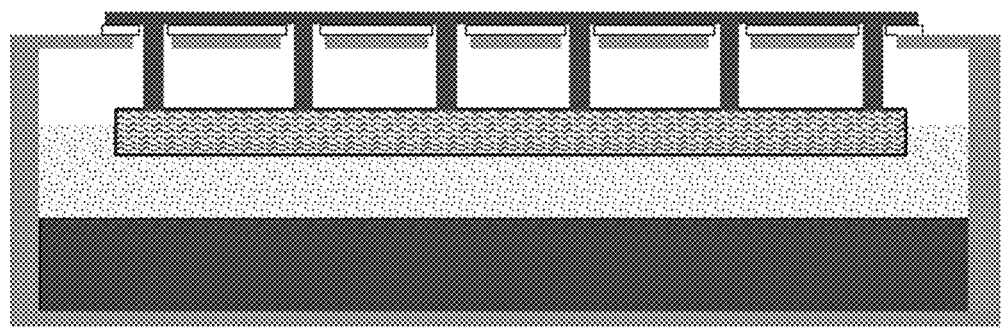

FIG. 6 shows multiple conductive feed-throughs. The electrochemical storage device and/or housings can comprise any number of conductive feed-throughs (e.g., 2, 3, 4, 5, 6, 7, 8, 9, 10, 11, 12, 13, 14, 15, 16, 17, 18, 19, 20, or more). In some cases, the conductive feed-throughs are separate (panel A). In some cases, the conductive feed-throughs share a common upper portion (panel B).

Hermetic Sealing of Cells

A hermetically sealed battery or battery housing may prevent an unsuitable amount of air, oxygen and/or water into the battery (e.g., an amount such that the battery maintains at least 80% of its energy storage capacity for at least one year, at least 2 years, at least 5 years, at least 10 or at least 20 years).

In some instances, the rate of oxygen, nitrogen, and water vapor transfer into the battery is less than about 0.25 mL per hour when the battery is contacted with air at a pressure of 1 bar and temperature of 400 to 700° C. In some embodiments, the number of moles of oxygen, nitrogen, or water vapor that leaks into the cell over a 10 year period is less than 10% of the number of moles of active metal material in the cell.

In an aspect, a battery comprises an anode and a cathode. The battery is capable of storing at least 10 Wh of energy and is hermetically or non-hermetically sealed. At least one of the anode and the cathode can be a liquid metal. In some cases, the anode is a liquid metal (e.g. lithium, magnesium, sodium).

In an aspect, a group of batteries is capable of storing at least 10 Wh of energy and each of the batteries are hermetically or non-hermetically sealed.

In an aspect, a battery housing comprises an electrically conductive container, a container aperture and a conductor in electrical communication with a current collector. The conductor may pass through the container aperture and is electrically isolated from the electrically conductive container. The housing may be capable of hermetically sealing a battery which is capable of storing at least 100 kWh of energy.

Embodiments of Electrochemical Cells, Batteries and Battery Housings

Figure 7:
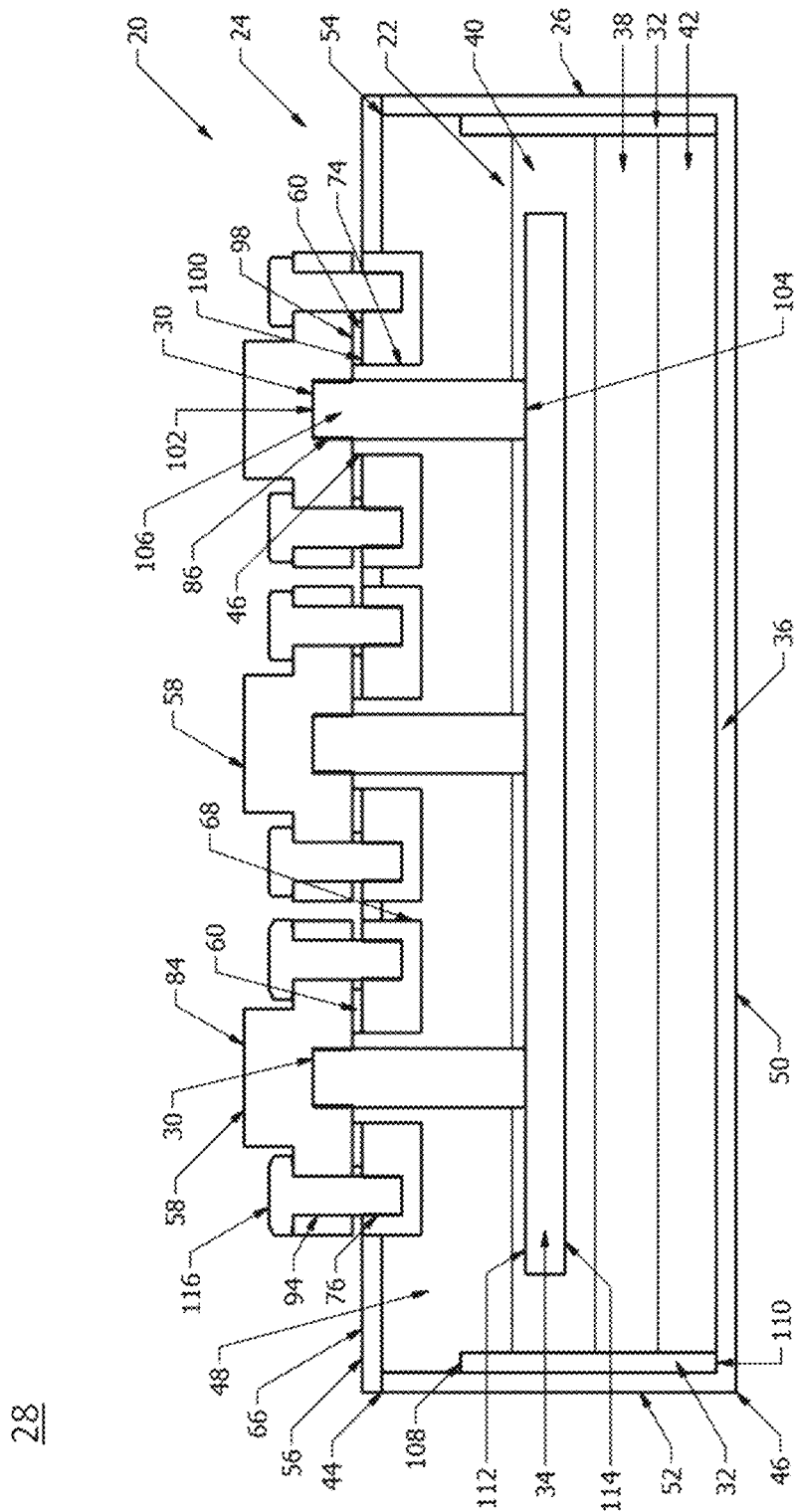
FIG. 7 is a schematic sectional illustration of an embodiment of an electrochemical battery.

FIG. 7 illustrates an electrochemical cell 20, in accordance with an embodiment of the invention. The cell 20 includes at least one electrochemical cell 22 sealed (e.g., hermetically sealed) within an electrochemical cell housing 24. The cell housing 24 includes a cell container 26, a container lid assembly 28 and one or more electrical conductors 30 (e.g., conductor rods). The cell housing 24 can also include a thermally and/or electrically insulating sheath 32, a first (e.g., negative) current collector 34 and a second (e.g., positive) current collector 36.

The battery cell 22 may be configured as a liquid metal battery cell. The battery cell 22 may include, for example, a liquid separator 38 arranged axially between a liquid first (e.g., negative) electrode 40 and a liquid second (e.g., positive) electrode 42.

In some instances, the electrochemical battery departs from that in FIG. 7. For example, the top electrode 40 can be contained within the top current collector (e.g., foam) 34. In this embodiment, the salt layer comes up in contact with the bottom and sides of the foam 34, and the top metal in the foam is held away from the sidewalls 32 or 26, thus allowing the cell to run without the insulating sheath 32. In some cases, a graphite sheath is used to prevent 'creeping' of the cathode up the sidewall, which can prevent shorting of the cell.

The separator 38 may be an ionically conducting liquid electrolyte. An example of a liquid electrolyte is a liquid solution of one or more ionically conductive molten salts such as, for example, fluoride salt, chloride salt, bromide salt, iodide salt, or a combination thereof. The first electrode 40 may be a liquid (e.g., molten) metal. Examples of materials that may be used as the first electrode 40 include, without limitation, sodium (Na), potassium (K), lithium (Li), calcium (Ca), barium (Ba), magnesium (Mg), or combinations thereof. The liquid metal of the first electrode 40 may contain one or more of the listed examples. The second electrode 42 may be a liquid metal or metalloid. Examples of materials that may be used as the second electrode 42 include, without limitation, antimony (Sb), lead (Pb), tin (Sn), bismuth (Bi), tellurium (Te), selenium (Se), or combinations thereof. The second electrode 42 may contain one or more of metals or metalloid metals listed above. Other examples of separator, first electrode and second electrode materials and/or configurations are disclosed in U.S. Patent Application Publication Nos. 2008/0044725, 2011/0014503, 2011/0014505 and 2012/0104990, each of which is entirely incorporated by reference herein. The present invention, however, is not limited to any particular battery cell configurations and/or materials.

Figure 13:
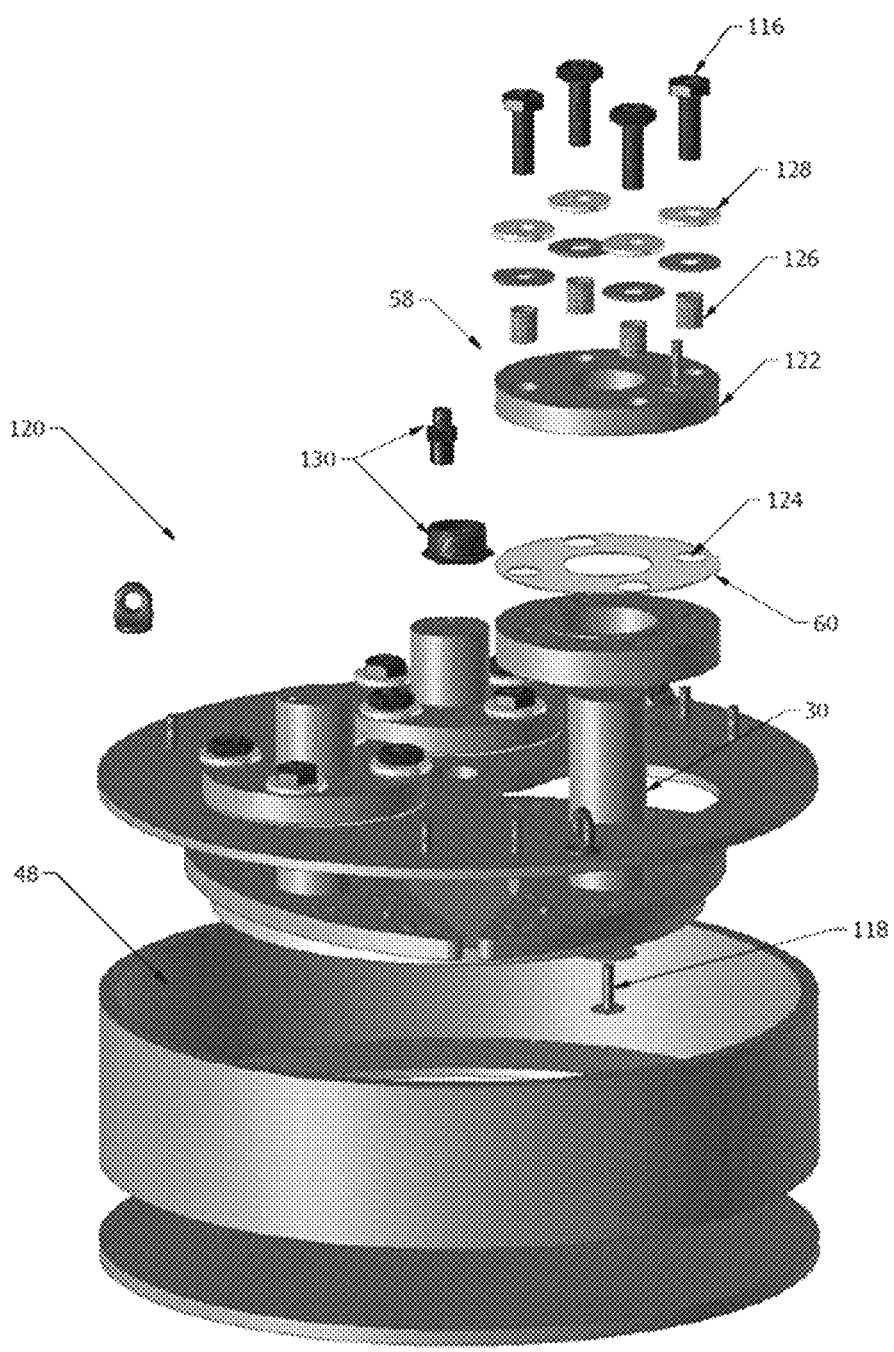
FIG. 13 is a schematic partially exploded perspective illustration of an alternate embodiment electrochemical battery housing.
Figure 16:
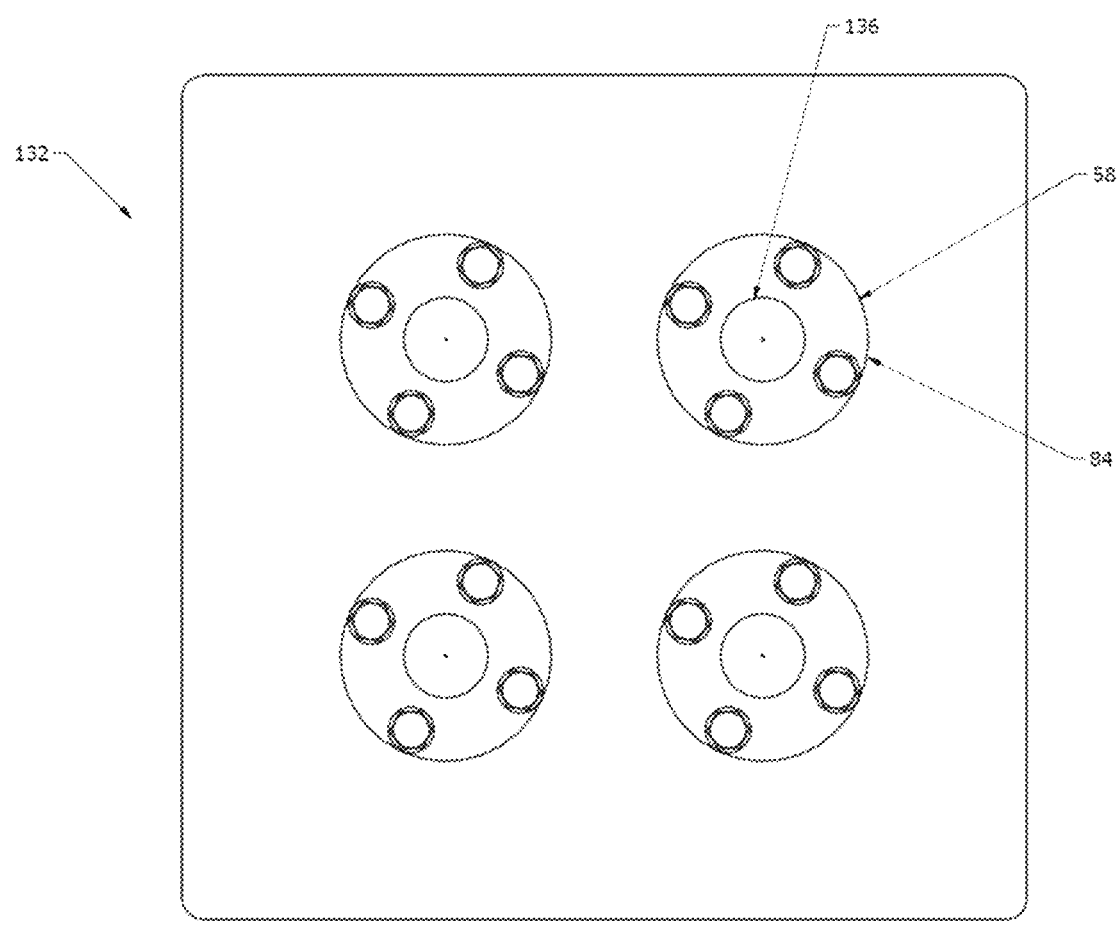
FIG. 16 is a schematic top view illustration of the battery stack illustrated in FIG. 15.

The battery container 26 can be constructed from an electrically conductive material such as, for example, steel, iron, stainless steel, graphite, nickel, nickel based alloys, titanium, aluminum, molybdenum, tungsten, or conductive glass. The cell container may also comprise of a structure component, and thinner lining component of a separate metal or electrically insulating coating, such as, for example, a steel container with a graphite lining, or a steel container with a boron nitride coating. The battery container 26 can have a cross-sectional geometry that can extend axially between a first container end (e.g., edge) 44 and a second container end (e.g., edge) 46. The cross-sectional geometry can be, for example, circular as illustrated in FIG. 13, rectangular (e.g., square) as illustrated in FIG. 16, or any other shape that may be selected based on design requirements for the battery 20. The battery container 26 includes a cell cavity 48 defined by a container (bottom) endwall 50 and a container sidewall 52. The cavity 48 can extend axially into the battery container 26 from a cavity aperture 54 that is located at the first container end 44 to the container endwall 50 that is located at the second container end 46. The cavity 48 can also extend laterally between opposing sides of the container sidewall 52.

The container lid assembly 28 can include an electrically conductive container lid 56, one or more electrically conductive flanges 58, and one or more electrically insulating gaskets 60 (e.g., annular dielectric gaskets).

Figure 8:
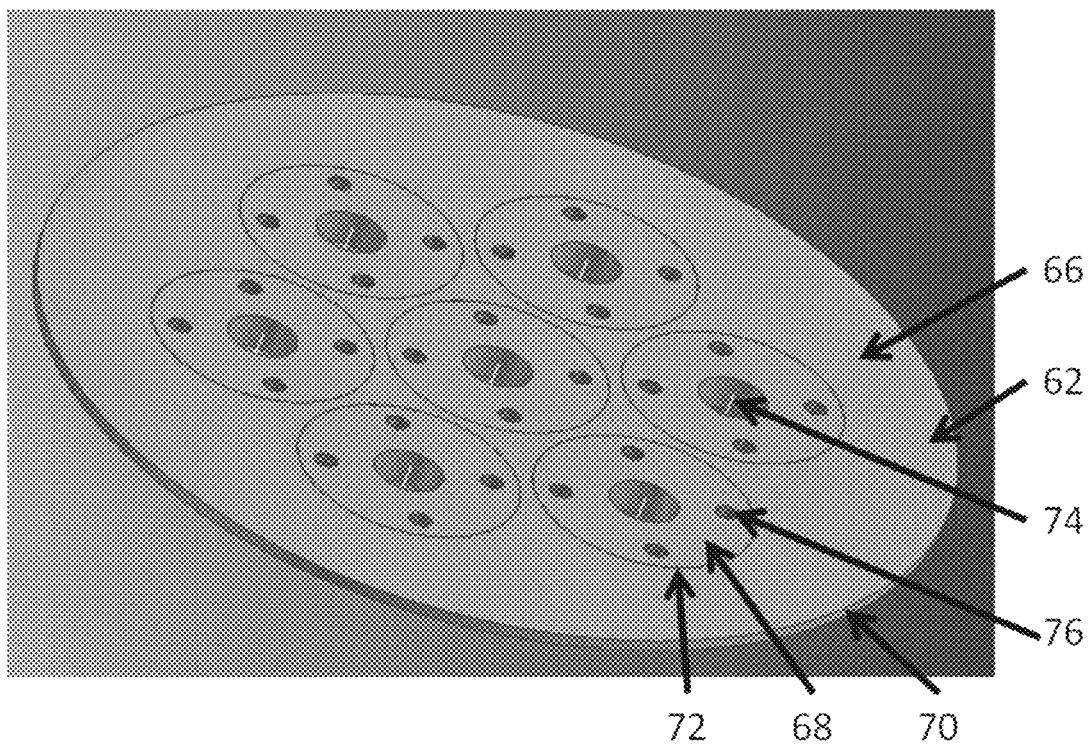
FIG. 8 is a schematic perspective illustration of a first end of a container lid for the battery illustrated in FIG. 7.
Figure 9:
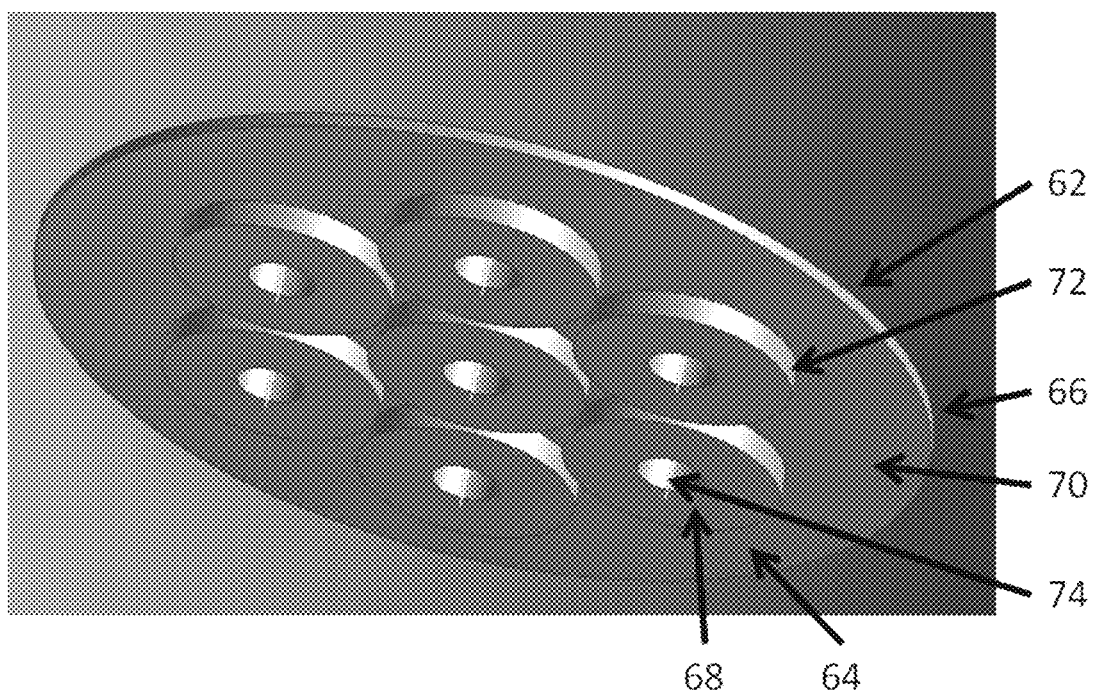
FIG. 9 is a schematic perspective illustration of a second end of the container lid for the battery illustrated in FIG. 7.

Referring to FIGS. 8 and 9, the container lid 56 can be constructed from an electrically conductive material such as, for example, steel, iron, copper, stainless steel, graphite, nickel, nickel based alloys, titanium, aluminum, molybdenum, tungsten, or conductive glass. The container lid 56 can extend axially between a first lid end 62 and a second lid end 64. The container lid 56 can include an electrically conductive base 66 and one or more electrically conductive mounting rings 68 (also referred to as "feed through flanges"). The base can extend axially between the first lid end 62 and a base end 70, which is located axially between the first lid end 62 and the second lid end 64. The base 66 can include one or more mounting ring apertures 72 that can extend axially through the base 66 between the first lid end 62 and the base end 70. The mounting rings 68 are respectively mated with the mounting ring apertures 72, and connected (e.g., welded, adhered or otherwise fastened) to the base 66. The mounting rings 68 can extend axially between the first lid end 62 and the second lid end 64. Each of the mounting rings 68 includes a first conductor aperture 74 that can extend axially therethrough between the first lid end 62 and the second lid end 64. The first conductor aperture 74 has a diameter that is, for example, at least 2 (e.g., between about 2 and 6) times less than a diameter of the cavity aperture 54 (see FIG. 7). Each of the mounting rings 68 may also include one or more threaded fastener apertures 76 arranged circumferentially around the respective first conductor aperture 74. The fastener apertures 76 extend axially into the respective mounting ring 68 from the first lid end 62.

Figure 10:
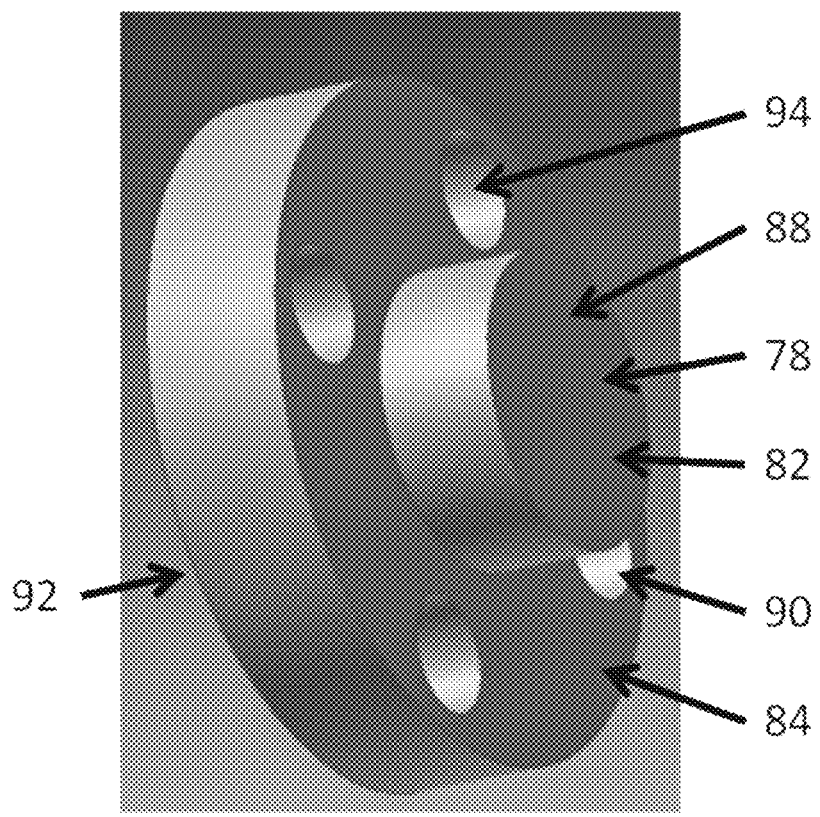
FIG. 10 is a schematic perspective illustration of a first end of a flange for the battery illustrated in FIG. 7.
Figure 11:
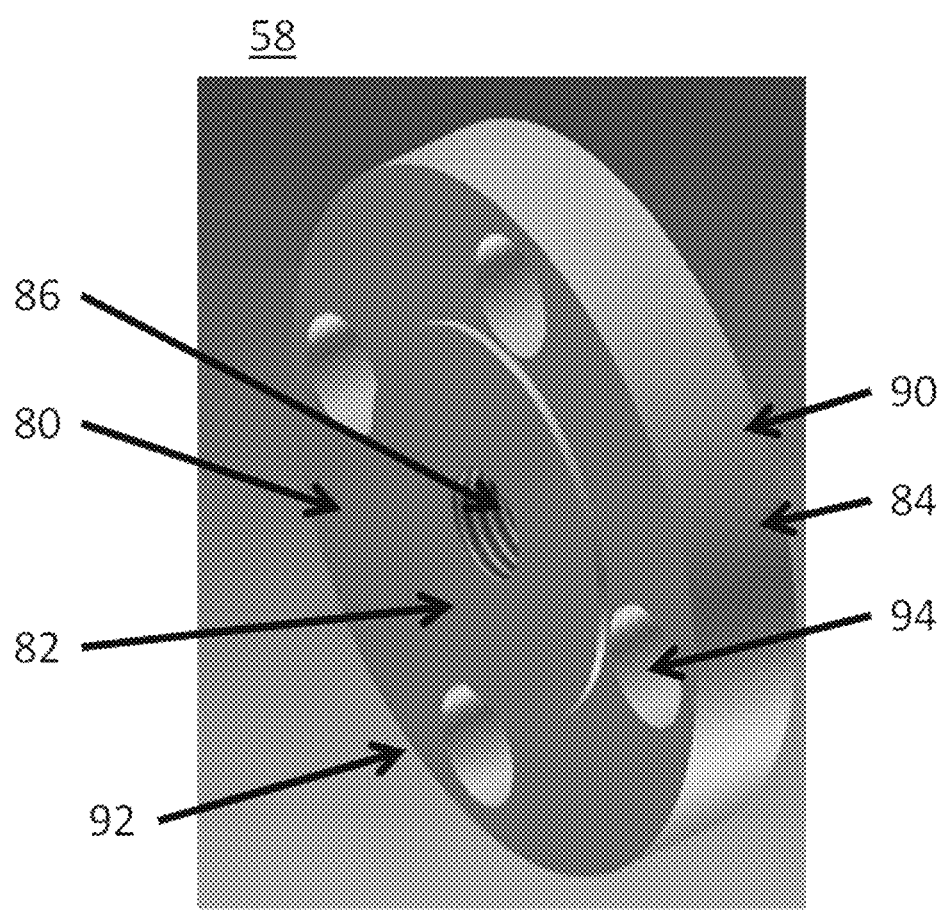
FIG. 11 is a schematic perspective illustration of a second end of the flange for the battery illustrated in FIG. 7.

Referring to FIGS. 10 and 11, each of the flanges 58 is constructed from an electrically conductive material such as, for example, steel, iron, stainless steel, graphite, nickel, nickel based alloys, titanium, aluminum, molybdenum, tungsten, or conductive glass. Each of the flanges 58 can extend axially from a first flange end 78 to a second flange end 80. Each of the flanges 58 may include an electrically conductive base 82 and an electrically conductive flange ring 84. The base 82 can extend axially between the first flange end 78 and the second flange end 80. The base 82 includes a threaded conductor aperture 86 that can extend axially into the base 82 from the second flange end 80 to a base endwall 88. The flange ring 84 can extend circumferentially around the base 82. The flange ring 84 can also extend axially between a first flange ring end 90 and a second flange ring end 92. The first flange ring end 90 may be offset from the first flange end 78 by a first axial distance, and/or the second flange ring end 92 may be offset from the second flange end 80 by a second axial distance. The flange ring 84 may include a plurality of fastener apertures 94 arranged circumferentially around the base 82. The fastener apertures 94 extend axially through the flange ring 84 between the first flange ring end 90 and the second flange ring end 92.

Figure 12:
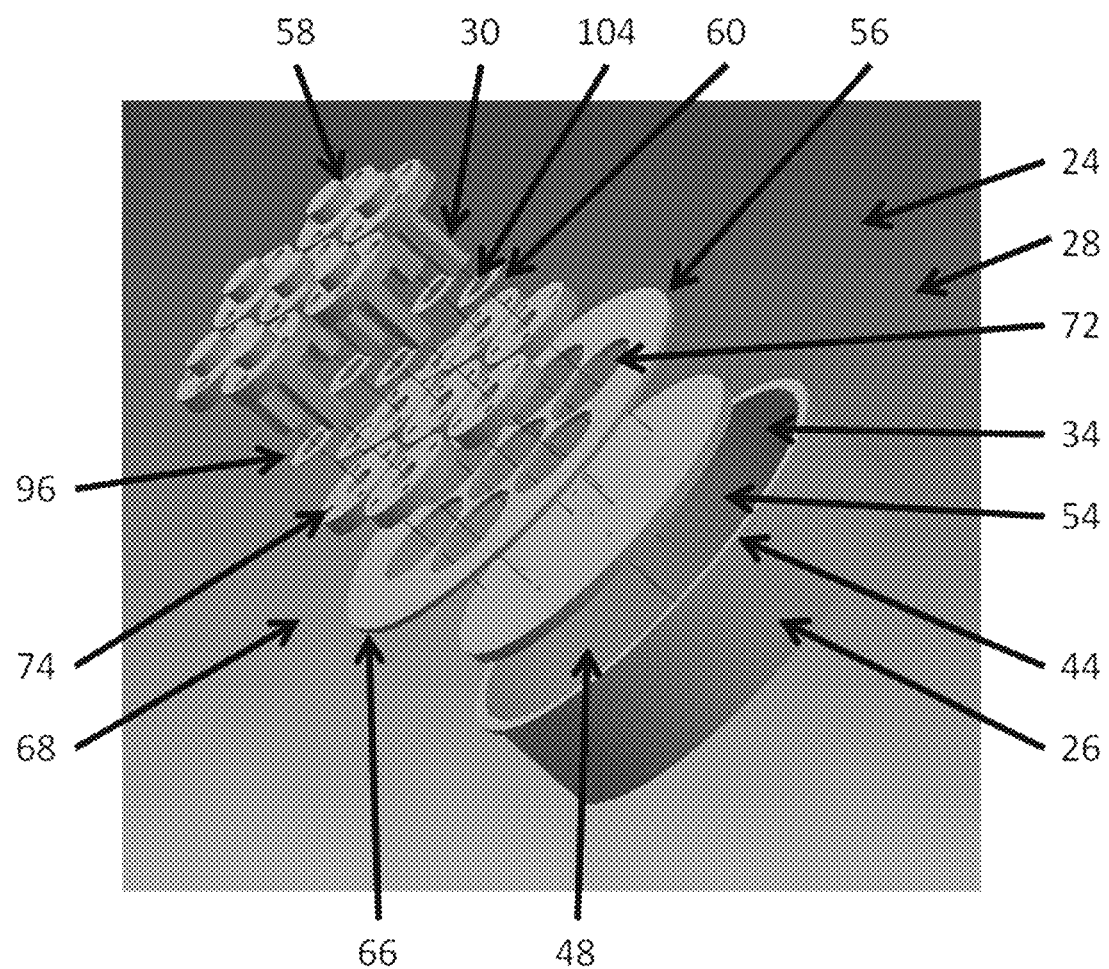
FIG. 12 is a schematic exploded perspective illustration of a container lid assembly for the battery illustrated in FIG. 7.

Referring to FIGS. 7 and 12, the gaskets 60 are constructed from a dielectric material such as, for example, glass, brazed ceramic, thermiculite, aluminum nitride, mica and/or vermiculite. Each of the gaskets 60 includes a second conductor aperture 96 that can extend axially therethrough between a first gasket end 98 and a second gasket end 100. The second conductor aperture 96 has a diameter that is substantially equal to or less than the diameter of a respective one of the first conductor apertures 74.

Referring to FIG. 7, the conductors 30 can be constructed from an electrically conductive material such as, for example, steel, iron, stainless steel, graphite, nickel, nickel based alloys, titanium, aluminum, molybdenum, or tungsten. The conductors 30 extend axially between a first conductor end 102 and a second conductor end 104. Each of the conductors 30 may include a threaded end region 106 adjacent the first conductor end 102.

Referring to FIG. 7, the sheath 32 can be constructed from a thermally insulating and/or electrically insulating material such as, for example, alumina, titania, silica, magnesia, boron nitride, or a mixed oxide including calcium oxide, aluminum oxide, silicon oxide, lithium oxide, magnesium oxide, etc. The sheath 32 has an annular cross-sectional geometry that can extend axially between a first sheath end (top) 108 and a second sheath end (bottom) 110.

As an alternative, the sheath can be used to prevent corrosion of the container and/or prevent wetting of the cathode material up the side wall, and may be constructed out of an electronically conductive material, such as steel, stainless steel, tungsten, molybdenum, nickel, nickel based alloys, graphite, or titanium. The sheath may be very thin and could be a coating. The coating can cover just the inside of the walls, and/or, can also cover the bottom of the inside of the container.

Referring to FIG. 7 and FIG. 12, the first current collector 34 is constructed from an electrically conductive material such as, for example, nickel-iron (Ni—Fe) foam, perforated steel disk, sheets of corrugated steel, sheets of expanded metal mesh, etc. The first current collector 34 may be configured as a plate that can extend axially between a first collector end 112 and a second collector end 114. The first current collector 34 has a collector diameter that is less than the diameter of the cavity aperture 54, and greater than the diameter of the first conductor aperture 74. Examples of other current collector configurations are disclosed in U.S. Patent Publication Nos. 2011/0014503, 2011/0014505, and 2012/0104990, which are entirely incorporated herein by reference. The present invention is not limited to any particular first current collector configurations.

The second current collector 36 may be configured as a part of the cell container 26. In the embodiment illustrated in FIG. 7, for example, the container endwall 50 is configured as the second current collector 36. As an alternative, the current collector may be discrete from and, for example, electrically connected to, the battery container. Examples of such a current collector arrangement are disclosed in the aforementioned U.S. Patent Publication Nos. 2011/0014503, 2011/0014505, and 2012/0104990, which are entirely incorporated herein by reference. The present invention is not limited to any particular second current collector configurations.

Figure 14:
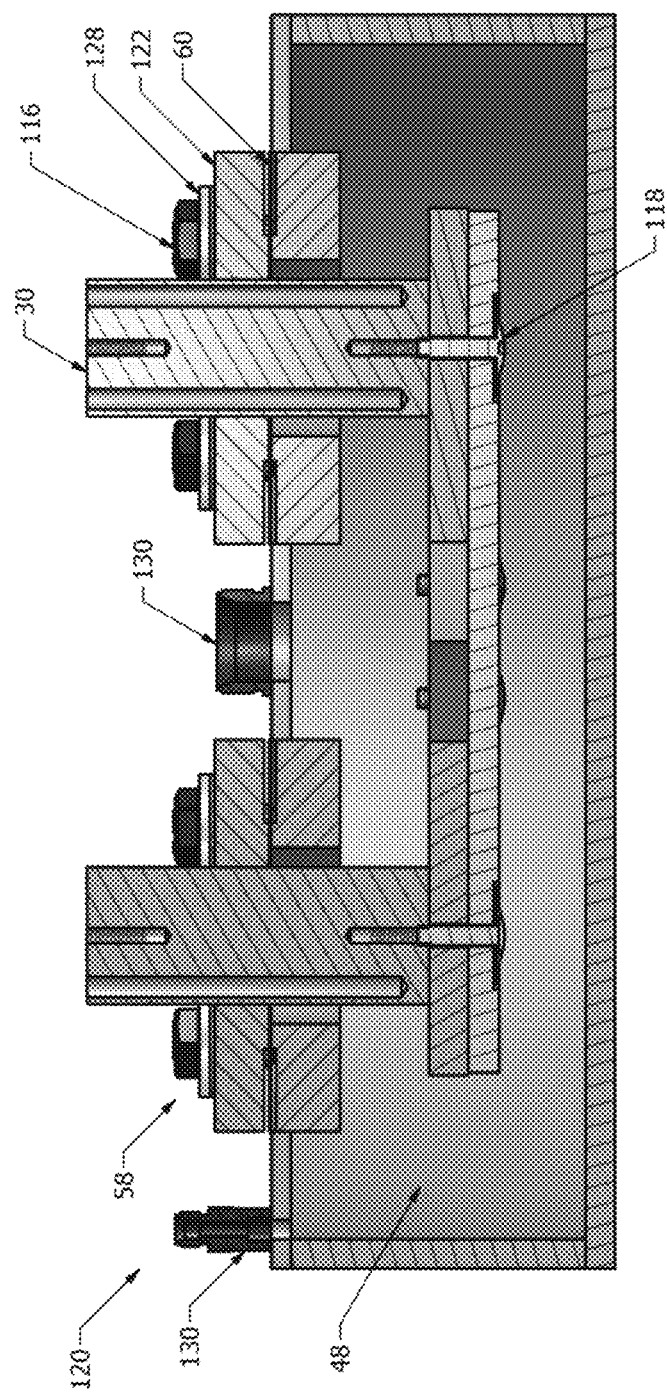
FIG. 14 is a schematic sectional illustration of the battery housing illustrated in FIG. 13.

FIGS. 13 and 14 illustrate an alternative embodiment electrochemical battery housing 120. A sheath in such a case can in some cases be precluded. In contrast to the battery housing 24 of FIGS. 7 and 12, each of the flanges 58 of the battery housing 120 includes a flange ring 122 that is directly connected (e.g., welded, glued, fused, adhered and/or otherwise fastened) to a respective one of the conductors 30. Each of the gaskets 60 of the battery housing 120 may additionally include a plurality of fastener apertures 124, which receive the fasteners 116. Each of the fasteners 116 may be electrically isolated from the flange ring 122 via an electrically insulating sleeve 126 and an electrically insulating washer 128. The sleeve 126 and the washer 128 are each constructed from a dielectric such as, for example, mica or vermiculite. The battery housing 120 may also include one or more fluid ports 130 (e.g., quick connect gas fittings) that direct fluid (e.g., inert gas) into and/or out of the sealed cavity 48.

Figure 15:
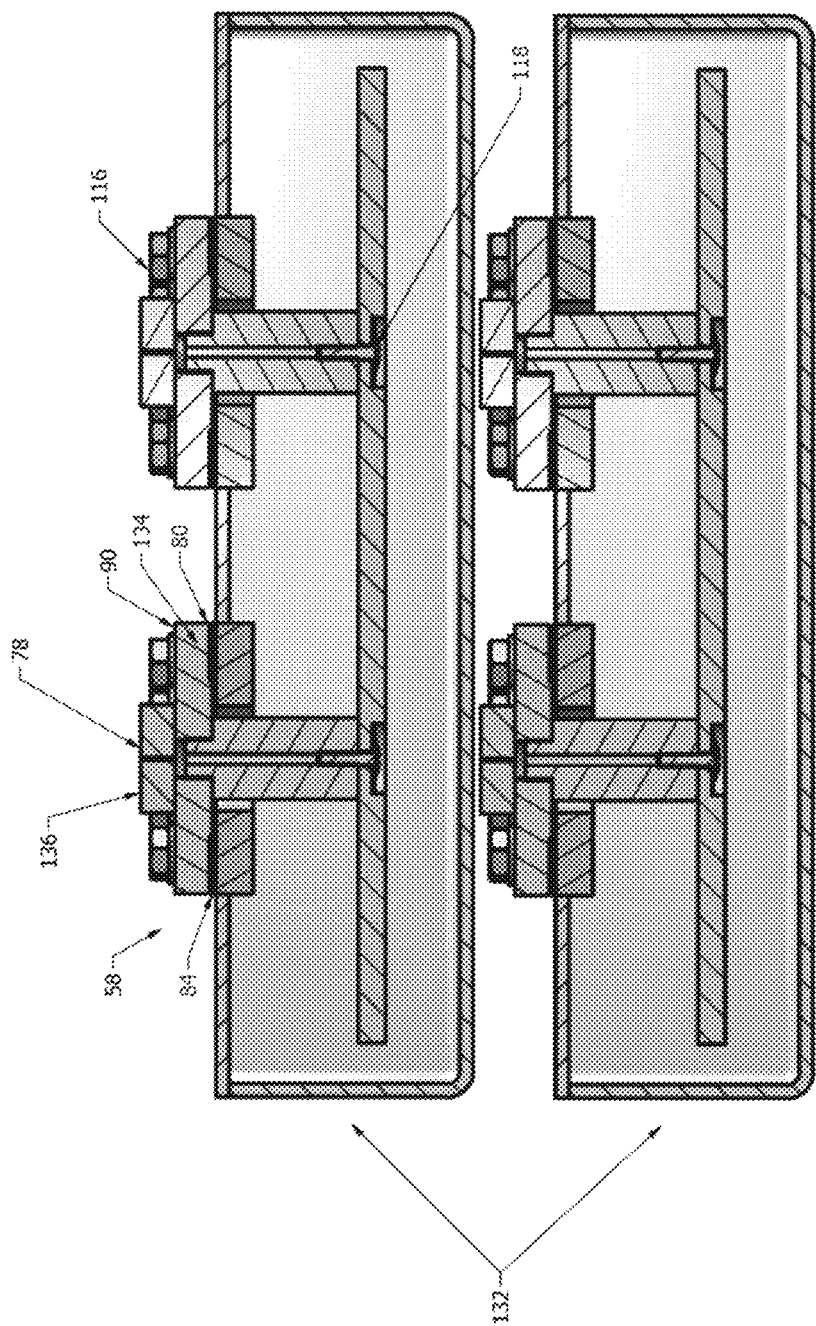
FIG. 15 is a schematic sectional illustration of an electrochemical battery stack that can include a plurality of alternate embodiment electrochemical battery housings.

FIGS. 15 and 16 illustrate another alternative embodiment electrochemical battery housing 132. In contrast to the battery housing 24 of FIGS. 7 and 12, each of the flanges 58 of the battery housing 132 includes a base 134 that can extend axially between the first flange ring end 90 and the second flange end 80. Each of the flanges 58 can also include a protrusion 136 (e.g., a boss) that is connected to the base 134 and/or the flange ring 84, and can extend axially to the first flange end 78. Such a protrusion 136 may be utilized for vertically stacking and/or electrically interconnecting a plurality of the battery housing 132 as illustrated in FIG. 15.

Figure 17:
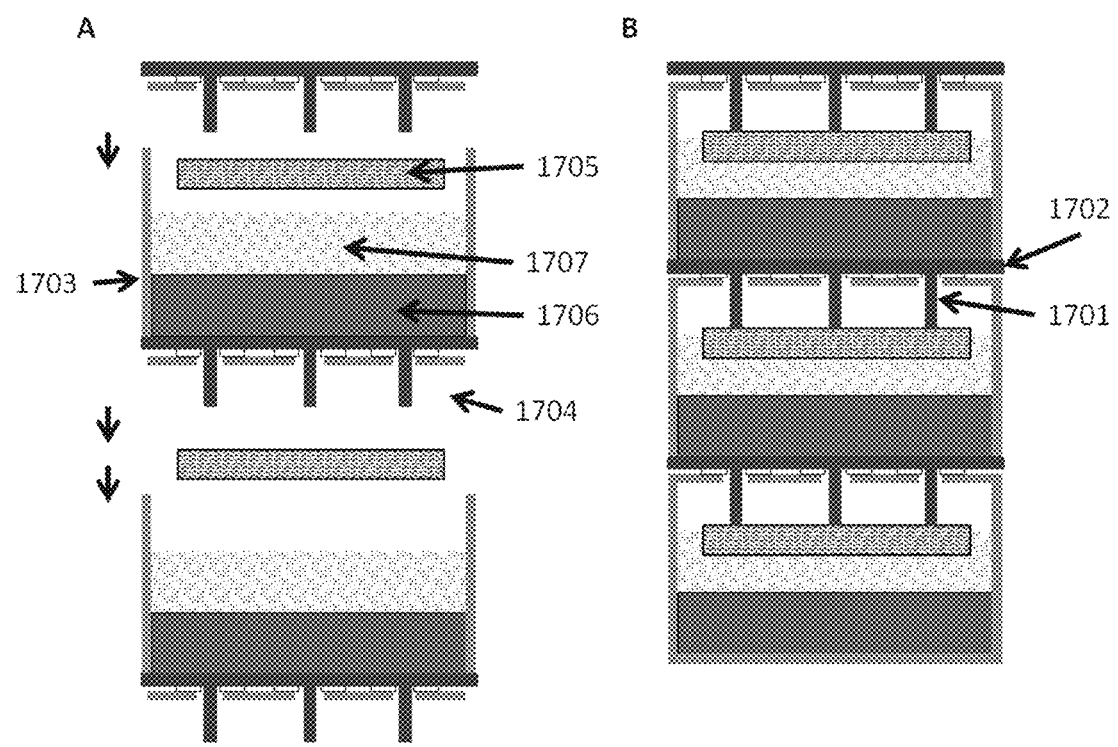
FIG. 17, panels A & B, are a schematic illustration where the conductive feed-throughs of a one cell are connected to the base of another cell.

FIG. 17 illustrates an embodiment that reduces the number of pieces of the electrochemical cells and/or batteries described herein (e.g., allows the assembly of a plurality of electrochemical cells using a single pre-assembled piece). In some cases, the conductors of a first electrochemical cell 1701 are connected to, and/or are formed from the same piece of metal as, the housing (e.g., positive current collector) of a second electrochemical cell 1702. In some cases, the top of a first electrochemical cell is directly connected to (e.g., welded or bolted) or formed from the same piece of metal as the bottom of a second electrochemical cell that is located on top of the first electrochemical cell. The cells can be assembled as shown in panel A in FIG. 17. As seen here, a plurality of pieces 1703 comprising a housing portion and a container lid assembly portion 1704 are put together (e.g., welded) one on top of another to form a plurality of electrochemical cells. The negative current collector 1705, positive electrode 1706 and electrolyte 1707 can be inserted and/or filled into the electrochemical cells as the cells are assembled from the pieces. The negative current collector 1705 can include (e.g., house, contain) the negative electrode. For example, the negative current collector 1705 can be a porous material that includes material of the negative electrode (e.g., lithium) in the pores of the negative current collector 1705.

The electrochemical cell can be hermetically and/or electrically sealed by placing a sealant material between two surfaces.

In an aspect, an electrochemical cell comprises an electrically conductive housing and a conductor in electrical communication with a current collector, wherein the conductor protrudes through the housing through an aperture in the housing and is electrically isolated from the housing with a seal that hermetically seals the electrochemical cell.

Figure 18:
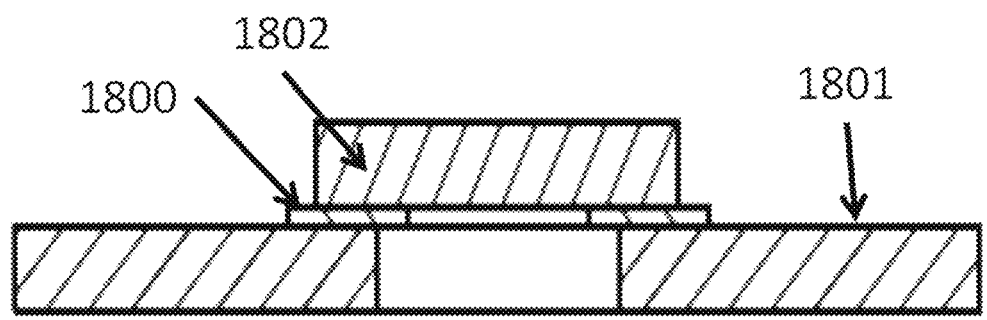
FIG. 18 is a cross-sectional illustration of a seal of an electrochemical cell.
Figure 19:
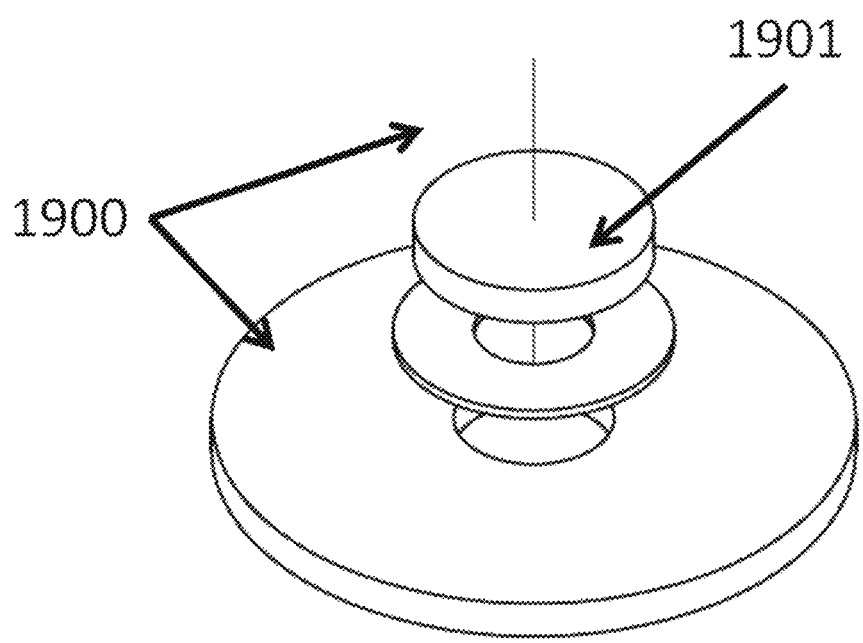
FIG. 19 is an exploded view illustration of a sealed electrochemical cell.
Figure 20:
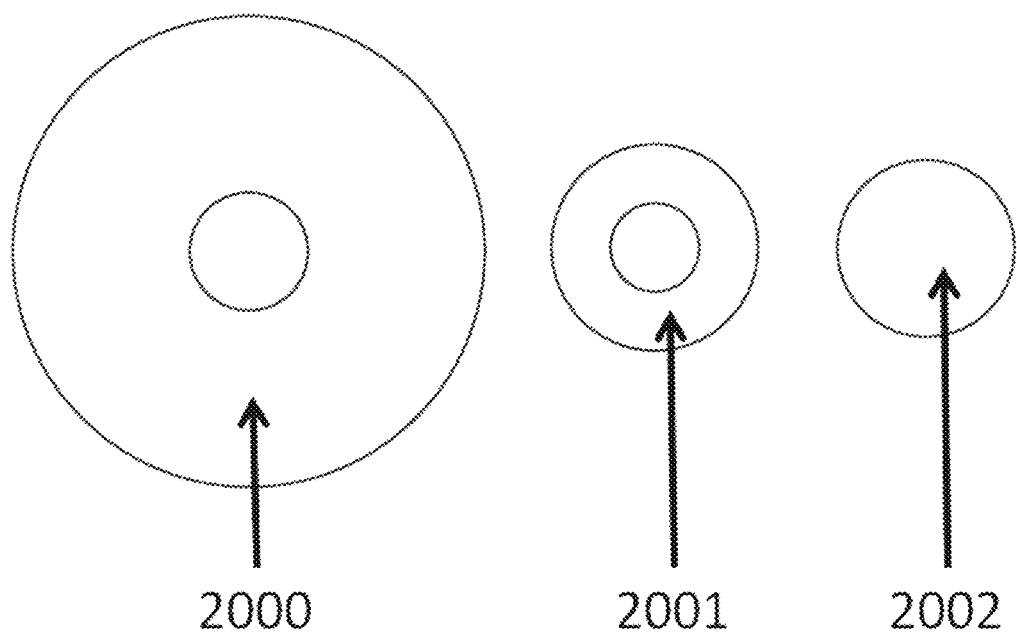
FIG. 20 is a top view illustration of the components of a seal of an electrochemical cell.

With reference to FIG. 18, the sealant 1800 can be disposed and/or placed between the housing of the electrochemical cell 1801 and another article 1802 (e.g., a conductive feed through). FIG. 19 shows that the two surfaces 1900 can be metal. In some cases, the seal and/or sealant 1901 is a ceramic, glass, or glass-ceramic composite. FIG. 20 shows a top view for each layer of the assembly with the electrochemical cell housing on the left 2000, the seal in the center 2001 and the article 2002 (e.g., conductive feed through) on the right.

Figure 21:
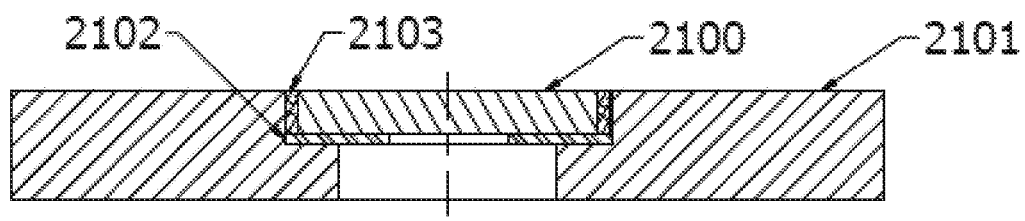

In some cases, the surfaces are made of dissimilar materials (i.e., materials that are not the same, such as two different metal surfaces). The materials can have different coefficients of thermal expansion. The dissimilar materials can be inlaid and/or recessed into one another (e.g., one material surrounds the other on at least two planes, such as a flat surface and an edge). FIG. 21 shows an embodiment where a conductive feed-through 2100 is inlaid in the housing of the electrochemical cell 2101. In some cases, the feed-through is sealed from the housing along two planes including along a horizontal plane 2102 and along the edges 2103 (i.e., a vertical plane).

Figure 22:
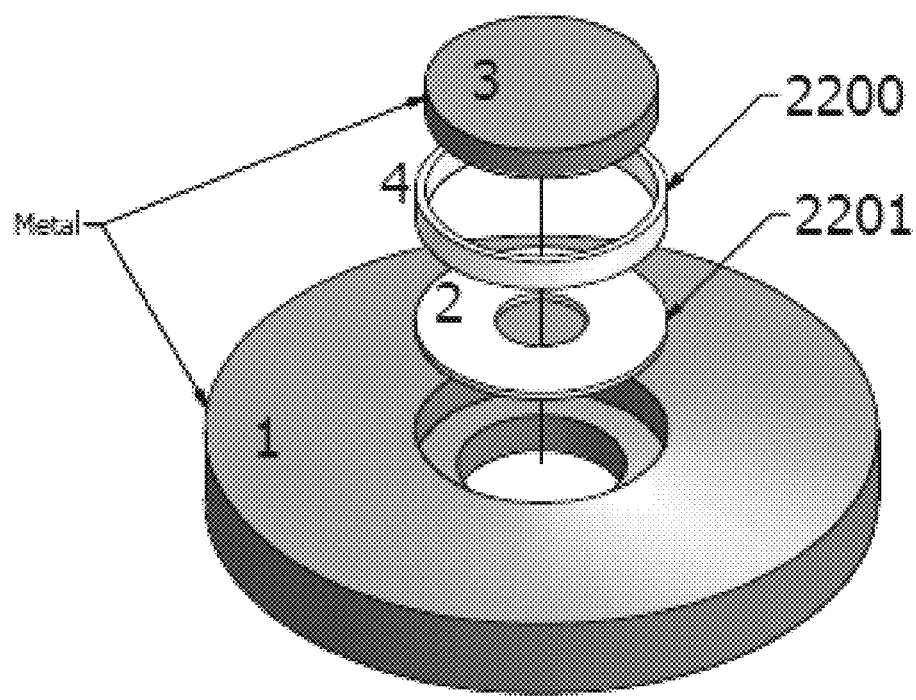

In some instances, the feed-through is recessed in the housing and electrically insulated from the housing on all sides, but only sealed along one plane. For example, a horizontal shim (e.g., made of ceramic material) can be put between the feed through and the housing in the horizontal direction and the sealant can be disposed along the vertical direction. In some embodiments, a vertical ring (e.g., made of ceramic material) is placed between the feed through and the housing in the vertical direction (e.g., along the edges) and the sealant can be disposed along the horizontal direction. FIG. 22 shows a 3-dimensional exploded view of the feed-through, housing and seal, horizontal shim 2201 and/or vertical ring 2200 along two planes (e.g., vertical and horizontal).

Figure 23:
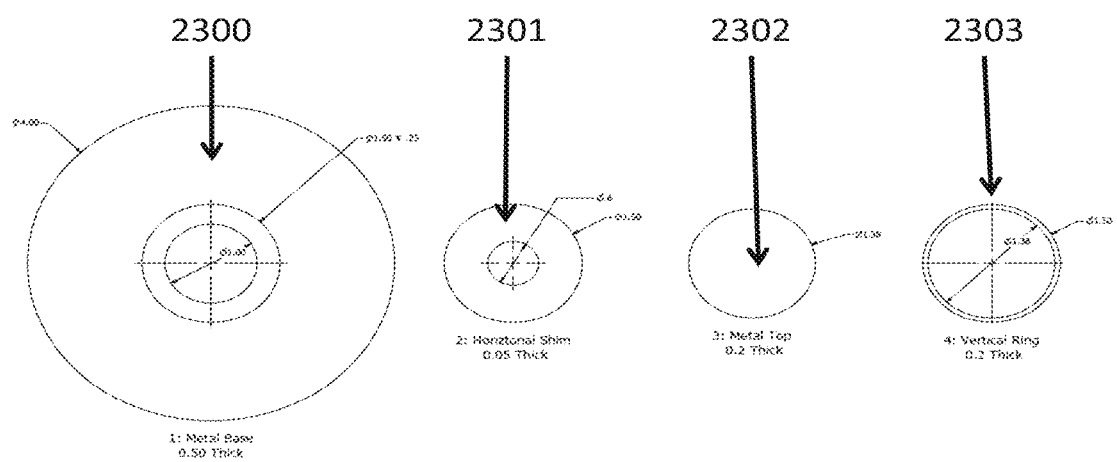

FIG. 23 shows a top view of each layer of the assembly including from left to right; the electrochemical cell housing 2300, the horizontal shim 2301, the conductive feed through 2302, and the vertical ring 2303 on the far right. In an embodiment, the layers of the assembly have relative dimensions as shown. In particular, the housing 2300 may have a hole with an inner diameter of one arbitrary unit (denoted by the symbol $\phi$) 1.00 with a second diameter of 1.5 and an outer diameter of 4.00 (e.g., 4 inches). The base of the housing 2300 can be made of metal and be about 0.5 thick. In some cases, the horizontal shim 2301 has an inner diameter of 0.6 and an outer diameter of 1.5 with a thickness of 0.05. In some embodiments, the conductive feed through 2302 has a diameter of 1.38 and a thickness of 0.2. In some instances, the vertical ring 2303 has an inner diameter of 1.38, an outer diameter of 1.5 and a thickness of 0.2.

A compressive force can be established on the seal if the housing and feed-through are made of dissimilar materials that have a different coefficient of thermal expansion. In some embodiments, the housing has a greater coefficient of thermal expansion than the feed-through. The seal can be put between the materials when expanded at a high temperature. Upon cooling, the materials can shrink in volume (e.g., with the outer housing shrinking more than the inner feed-through) to establish a compressive force upon the seal. The force can be any suitable force (e.g., suitable for hermetically sealing the electrochemical cell). In some cases, the force is about 1,000 psi, about 2,000 psi, about 5,000 psi, about 10,000 psi, or about 20,000 psi. In some cases, the force is at least 1,000 psi, at least 2,000 psi, at least 5,000 psi, at least 10,000 psi, or at least 20,000 psi.

In an aspect, a method for sealing an electrochemical cell comprises (a) applying a sealant material between a housing and an article recessed into the housing, wherein the sealant is applied at a temperature at which the sealant material is malleable, viscous, and/or flowable, and wherein the housing and the article have different coefficients of thermal expansion; and (b) lowering the temperature to a temperature at which the sealant material is not malleable, viscous, and/or flowable, i.e. solidifies or hardens, thereby creating a seal between the housing and the article that is under a compressive force. In some embodiments, the seal is under compression at the operating temperature of the electrochemical cell.

The sealant can be any suitable material. In some instances, the seal is formed by brazing ceramic onto a metal substrate. In some embodiments, the seal is formed by solidifying ceramic and/or glass. In some embodiments, the seal is formed by mechanically and/or chemically bonded glass or glass-ceramic composite.

In some cases, the sealant material is a re-flowable material such as borosilicate glass (or other seal-specific glass). In such an embodiment, a hermetic seal can be established by sliding a borosilicate glass tube around the cell top as a horizontal spacer. After insertion of the re-flowable material into the inlaid space, heating to a temperature of about, for example, 700 to 800° C. can allow flow of the borosilicate glass to form a glass seal. The seal can be stable at the temperatures of battery operation. In some instances, the glass seal is suitably thick to hermetically seal the cell and be resilient to shear stress. In some embodiments, the cell is slowly and evenly cooled following melting such that the seal forms evenly without cracks, delamination, and the like.

In some cases, more than one sealant material can be used. In some embodiments, the seal is formed from at least two different materials, at least one of which is resistant to degradation from contact with materials contained in the electrochemical cell. In some embodiments, the seal is resistant to reactive metal vapors such as sodium (Na), lithium (Li) or magnesium (Mg). In some instances, the seal is a chalcogenide seal (e.g., comprises a chalgen such as $CaAl_2S_4$). In some embodiments, the sealant material is a chalcogenide based compound. In some cases, the chalcogenide has the chemical formula $CaAl_2S_4$.

Systems, apparatuses and methods of the disclosure may be combined with or modified by other systems, apparatuses and/or methods, such as batteries and battery components described in U.S. Patent Publication No. 2012/0104990 ("Alkali Metal Ion Battery with Bimetallic Electrode"), which is entirely incorporated herein by reference.

Energy storage devices of the disclosure may be used in grid-scale settings or stand-alone settings. Energy storage device of the disclosure can, in some cases, be used to power vehicles, such as scooters, motorcycles, cars, trucks, trains, helicopters, airplanes, and other mechanical devices, such as robots.

A person of skill in the art will recognize that the battery housing components may be constructed from materials other than the examples provided above. One or more of the electrically conductive battery housing components, for example, may be constructed from metals other than steel and/or from one or more electrically conductive composites. In another example, one or more of the electrically insulating components may be constructed from dielectrics other than the aforementioned glass, mica and vermiculite. The present invention therefore is not limited to any particular battery housing materials.

It is to be understood that the terminology used herein is used for the purpose of describing specific embodiments, and is not intended to limit the scope of the present invention. It should be noted that as used herein, the singular forms of "a", "an" and "the" include plural references unless the context clearly dictates otherwise. In addition, unless defined otherwise, all technical and scientific terms used herein have the same meaning as commonly understood by one of ordinary skill in the art to which this invention belongs.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. An electrochemical battery, comprising:
   a container including a cavity that extends into the container from a cavity aperture;
   an electrochemical battery cell arranged within the cavity, wherein the electrochemical battery cell comprises an electrolyte arranged between a negative electrode and a positive electrode, and wherein at least one of the negative electrode and the positive electrode is liquid at an operating temperature of the electrochemical battery greater than 250° C.;
   a container lid assembly sealing the battery cell in the cavity, the container lid assembly including an electrically conductive container lid and an electrically conductive flange, wherein the container lid covers the cavity aperture and includes a conductor aperture that extends through the container lid, wherein the electrically conductive flange covers the conductor aperture and is electrically isolated from the container lid, and wherein the electrically conductive flange is in electrical communication with the negative metal electrode and the container lid is in electrical communication with the positive electrode; and
   an electrical conductor extending through the conductor aperture and electrically coupled to the electrochemical battery cell and the electrically conductive flange, wherein the conductor is electrically isolated from the container lid.

2. The battery of claim 1, further comprising a current collector electrically coupled to the negative electrode, wherein the current collector is connected to the conductor, and wherein the conductor is connected to the electrically conductive flange.

3. The battery of claim 1, further comprising a gasket arranged between and electrically isolating the electrically conductive flange and the container lid.

4. The battery of claim 3, wherein the gasket comprises dielectric material.

5. The battery of claim 1, wherein said container lid assembly hermetically seals said battery cell in said cavity.

6. The battery of claim 1, wherein the container is in electrical communication with an electrode of the electrochemical battery cell.

7. The battery of claim 1, wherein the electrochemical battery is capable of storing at least 25 Wh of energy.

8. The battery of claim 1, wherein a ratio of an area of the conductor aperture to an area of the container is less than 0.2.

9. The battery of claim 1, wherein the flange covers a portion of the conductor aperture.

10. The battery of claim 1, further comprising a current collector within the cavity and connected to the conductor.

11. The battery of claim 3, wherein the gasket comprises a ceramic material.

12. The battery of claim 3, wherein the gasket comprises aluminum nitride.

13. The battery of claim 3, wherein the gasket is annular.

14. The battery of claim 10, wherein the current collector is a metal foam or metal mesh.

15. The battery of claim 1, wherein the positive electrode comprises antimony.

16. The battery of claim 1, wherein the negative electrode comprises calcium.

17. The battery of claim 1, wherein the electrically conductive flange is connected to the container lid with a brazed ceramic.

18. The battery of claim 1, wherein the electrically conductive flange is connected to the container lid with a plurality of fasteners.

* * * * *